United States Patent
Kalluri et al.

(10) Patent No.: US 7,852,951 B2
(45) Date of Patent: Dec. 14, 2010

(54) MULTICARRIER RECEIVER FOR MULTIPLE-INPUT MULTIPLE-OUTPUT WIRELESS COMMUNICATION SYSTEMS AND METHOD

(75) Inventors: Sudhakar Kalluri, Folsom, CA (US); Tein Yow Yu, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 999 days.

(21) Appl. No.: 11/241,189

(22) Filed: Sep. 30, 2005

(65) Prior Publication Data

US 2007/0076805 A1 Apr. 5, 2007

(51) Int. Cl.
 H04K 1/10 (2006.01)
 H04L 27/28 (2006.01)
 H04B 7/02 (2006.01)
 H04L 1/02 (2006.01)
 H03H 7/30 (2006.01)
 H03H 7/40 (2006.01)
 H03K 5/159 (2006.01)

(52) U.S. Cl. .............. 375/260; 375/267; 375/346; 375/231; 375/316; 375/229; 455/59; 455/132; 455/504; 370/201; 333/18

(58) Field of Classification Search .............. None
See application file for complete search history.

(56) References Cited

U.S. PATENT DOCUMENTS

| | | | |
|---|---|---|---|
| 6,584,145 B1 | 6/2003 | Camagna et al. | |
| 6,907,084 B2 * | 6/2005 | Jeong | 375/261 |
| 7,230,976 B2 | 6/2007 | Holt | |
| 7,289,585 B2 * | 10/2007 | Sandhu et al. | 375/347 |
| 7,302,009 B2 * | 11/2007 | Walton et al. | 375/267 |
| 7,457,366 B2 * | 11/2008 | Maltsev et al. | 375/260 |
| 2002/0027956 A1 * | 3/2002 | Lee et al. | 375/262 |
| 2003/0076908 A1 * | 4/2003 | Huang et al. | 375/350 |
| 2003/0123582 A1 * | 7/2003 | Kim et al. | 375/347 |
| 2005/0058193 A1 * | 3/2005 | Saed | 375/232 |
| 2005/0152484 A1 * | 7/2005 | Sandhu et al. | 375/347 |
| 2006/0013296 A1 * | 1/2006 | Carrer et al. | 375/232 |
| 2006/0087960 A1 * | 4/2006 | Kim et al. | 370/203 |
| 2006/0088006 A1 * | 4/2006 | Chimitt | 370/332 |
| 2006/0116155 A1 * | 6/2006 | Medvedev et al. | 455/522 |
| 2007/0116143 A1 * | 5/2007 | Bjerke et al. | 375/262 |
| 2008/0192849 A1 * | 8/2008 | Kim et al. | 375/260 |
| 2008/0205259 A1 * | 8/2008 | Shtin | 370/208 |
| 2008/0298452 A1 * | 12/2008 | Sampath et al. | 375/232 |
| 2009/0041152 A1 * | 2/2009 | Ko et al. | 375/267 |
| 2009/0080508 A1 * | 3/2009 | Gore et al. | 375/232 |
| 2009/0143017 A1 * | 6/2009 | Barak et al. | 455/65 |

* cited by examiner

Primary Examiner—Shuwang Liu
Assistant Examiner—Gina McKie
(74) Attorney, Agent, or Firm—Schwegman, Lundberg & Woessner, P.A.; Gregory J. Gorrie

(57) ABSTRACT

Embodiments of a multicarrier receiver and method for generating soft bits in a multiple-input multiple-output system are generally described herein. In some embodiments, operational parameters for an equalizer and a soft-bit demapper in a multicarrier receiver are determined. Other embodiments may be described and claimed.

26 Claims, 8 Drawing Sheets

TRAINING UNIT

TRAINING UNIT

MULTICARRIER RECEIVER FOR MULTIPLE-INPUT MULTIPLE-OUTPUT WIRELESS COMMUNICATION SYSTEMS AND METHOD

TECHNICAL FIELD

Embodiments of the present invention pertain to wireless communication systems. Some embodiments pertain to multicarrier receivers. Some embodiments pertain to receivers that receive signals through more than one antenna.

BACKGROUND

Multiple-input-multiple-output (MIMO) wireless communication systems concurrently transmit information using more than one spatial channel. Some of these communication systems use multiple subcarriers (i.e., tones) and modulate subsymbols on the subcarriers. These systems may transmit simultaneously using multiple antennas with each antenna transmitting using the same subcarriers.

During propagation to the receiver, the subsymbols carried on each subcarrier and spatial channel are generally distorted by background noise and cross-talk, among other things. Cross-talk may refer to the distorting influence that a particular subsymbol transmitted on a particular subcarrier and spatial channel has upon another subsymbol carried on the same subcarrier of another spatial channel. Separating the transmitted spatial data streams and removing the effects of cross-talk and noise at the receiver is a complex process and is very processing intensive.

Thus there are general needs for separating spatial data streams and removing the effects of cross-talk and noise at the receiver with reduced complexity and a reduced number of operations.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
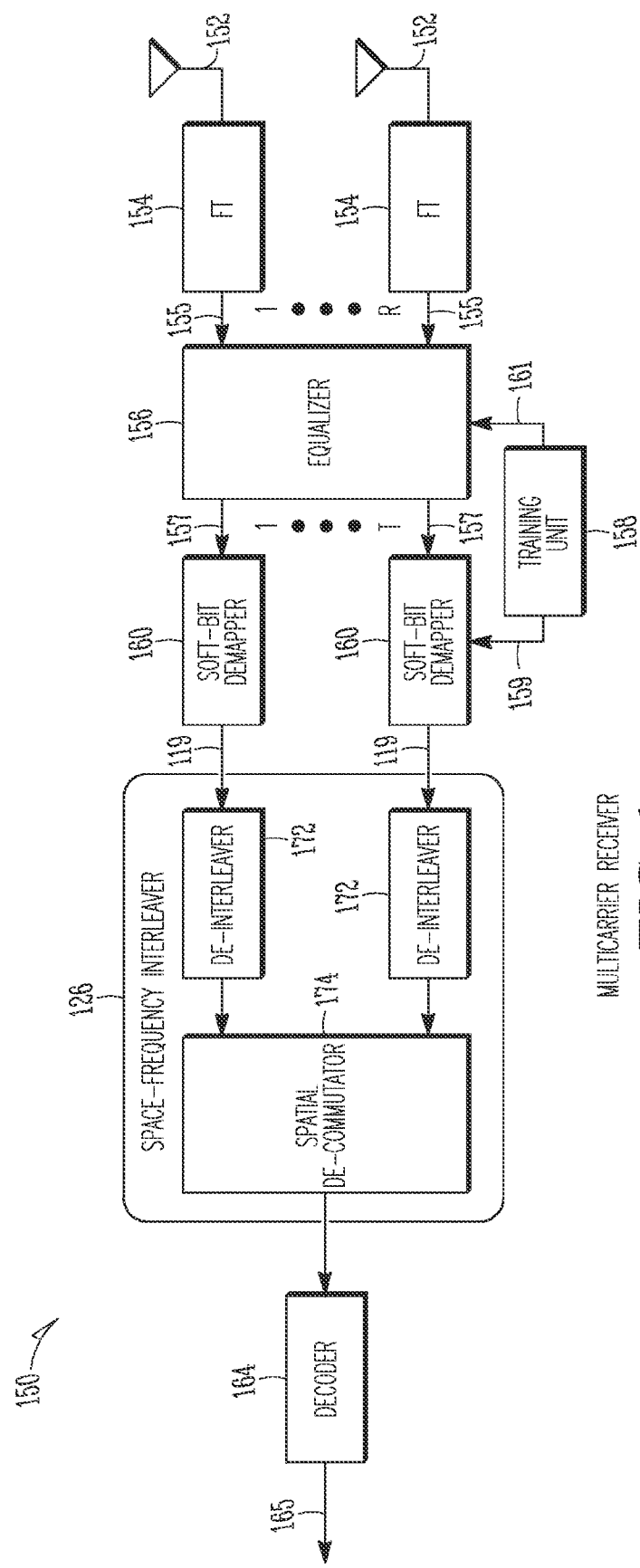
FIG. 1 is a block diagram of a multicarrier receiver in accordance with some embodiments of the present invention.

FIG. 1 is a block diagram of a multicarrier receiver in accordance with some embodiments of the present invention. Multicarrier receiver 150 receives multicarrier signals through two or more antennas 152 and generates decoded bit stream 165 by processing the received signals. Multicarrier receiver 150 includes Fourier transform (FT) circuitry 154, equalizer 156, training unit 158, soft-bit demappers 160, space-frequency de-interleaver 162 and decoder 164.

Multicarrier receiver 150 may include as many or more receive antennas 152 as was used by a transmitting station (not shown). Each antenna 152 may be coupled (indirectly) to Fourier transform circuitry 154, which may perform fast Fourier transforms. Each of Fourier transform circuitry 154 may provide frequency domain signals 155 comprising a set of complex numbers that may describe the frequency content received on each tone. For example, if a number of subcarriers is employed by multicarrier receiver 150, then that number of complex numbers may be provided by each Fourier transform circuitry 154.

Each Fourier transform circuitry 154 may be coupled to equalizer 154. When receiver 150 employs R antennas 152, then equalizer 156 may receive a quantity of R times the number of subcarriers complex numbers per symbol from Fourier transform circuitry 154. The quantity of antennas R may range from two to up to ten or more. Equalizer 156 may substantially remove the effects of cross-talk and noise and may compute an "equalized" set of complex numbers. One complex number may be used to describe the frequency content for each tone and spatial channel employed by the transmitting station.

Receiver 150 may also include multiple soft-bit demappers 160 coupled to equalizer 156. One demapper 160 may be provided for each spatial channel employed by the transmitting station. Each demapper 160 may generate a set of soft bits for each of the subcarriers. Each soft bit of a subsymbol may represent the likelihood that a given subsymbol on a given tone corresponds to a particular soft bit being a one or a zero. Soft bits 119 from demappers 160 may be provided to space-frequency de-interleaver 162 for deinterleaving and decommutation to generate one or more streams of soft bits which may be provided to decoder 164. Decoder 164 may recover hard bits (i.e., information) from the soft bits and may generate decoded bit stream 165.

In some embodiments, equalizer 156 and soft-bit demappers 160 are supplied with parameters. In a packet-based system, data is transmitted in the form of a "packet," which includes a preamble followed by data. During processing of the preamble of each packet, the parameters for equalizer 156 and soft-bit demappers 160 may be calculated. The process of calculating the parameters and providing the parameters to demappers 160 and equalizer 156 is referred to as training, which may be performed by training unit 158.

In some embodiments, training unit 158 may calculate the parameters in a manner involving a reduced or a minimal complexity. Complexity may be measured by the number of real or complex multiplication and division operations. In some embodiments, training unit 158 may calculate the aforementioned parameters using a reduced number of division and multiplication operations, although the scope of the invention is not limited in this respect. For similar reasons, soft-bit demappers 160 and equalizer 156 may operate in a manner involving reduced complexity, although the scope of the invention is not limited in this respect.

In some embodiments, space-frequency de-interleaver 162 may include one or more deinterleavers 172 and spatial de-commutator 174. Deinterleavers 172 may perform deinterleaving operations on the soft bits generated from soft-bit demappers 160 for each spatial channel and spatial de-commutator 174 may combine the deinterleaved soft bits generated from deinterleavers 172. Although space-frequency de-interleaver 162 is illustrated has having deinterleavers 172 and spatial de-commutator 174, this is not a requirement as space-frequency de-interleaver 162 may include other functional elements and configurations to deinterleave and combine soft bits for decoder 164.

In some embodiments, equalizer 156 may multiply each tone of frequency domain signals 155 generated from each of a plurality of receive signal paths by equalizer coefficient matrix 161 to remove at least some or most crosstalk (e.g., on the same tone) and noise to generate spatially equalized frequency domain signals 157 for each subcarrier. In these embodiments, soft-bit demapper 160 for each spatial channel may multiply the spatially equalized frequency domain signals 157 by soft-bit weights 159 for use in generating soft bits 119. In some embodiments, training unit 158 may generate equalizer coefficient matrix 161 for each subcarrier and may generate soft-bit weights 159 from effective channel taps. In some embodiments, training unit 158 may generate equalizer coefficient matrix 161 for each subcarrier and may generate soft-bit weights 159 from a channel estimate matrix, an average energy of transmitted sub-symbols, and/or a matrix related to a noise correlation matrix. These embodiments are discussed in more detail below.

In some embodiments, equalizer 156, soft-bit demappers 160 and training unit 158 may be part of the baseband processing circuitry of a wireless communication device. In some embodiments, multicarrier receiver 150 may be part of a wireless communication device that may transmit orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have a null at substantially a center frequency of the other subcarriers and/or each subcarrier may have an integer number of cycles within a symbol period, although the scope of the invention is not limited in this respect. In some embodiments, the number of subcarriers may range from as few as 48 or less to as great as 256 or more.

In some embodiments, multicarrier receiver 150 may be part of a wireless access point (AP), such as a Wireless Fidelity (WiFi), Worldwide Interoperability for Microwave Access (WiMax), or broadband communication station, although the scope of the invention is not limited in this respect as multicarrier receiver 150 may be almost any wireless communication device. In some embodiments, multicarrier receiver 150 may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television or other device that may receive and/or transmit information wirelessly. In some broadband and WiMax embodiments, multicarrier receiver 150 may be part of a receiving station.

In some embodiments, the frequency spectrums for a multicarrier communication signal may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, multicarrier receiver 150 may communicate in accordance with specific communication standards, such as the Institute of Electrical and Electronics Engineers (IEEE) standards including IEEE 802.11 (a), 802.11 (b), 802.11 (g), 802.11 (h) and/or 802.11 (n) standards for wireless local area networks (WLANs), although multicarrier receiver 150 may also be suitable to receive communications in accordance with other techniques including the Digital Video Broadcasting Terrestrial (DVB-T) broadcasting standard, and the High performance radio Local Area Network (HiperLAN) standard. In some broadband and WiMax embodiments, multicarrier receiver 150 may receive broadband wireless communications in accordance with the IEEE 802.16(e) standards for wireless metropolitan area networks (WMANs). For more information with respect to IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

Antennas 152 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a signal antenna with multiple apertures may be used.

Although multicarrier receiver 150 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of the processing circuitry may refer to one or more processes operating on one or more processing elements.

Figure 2:
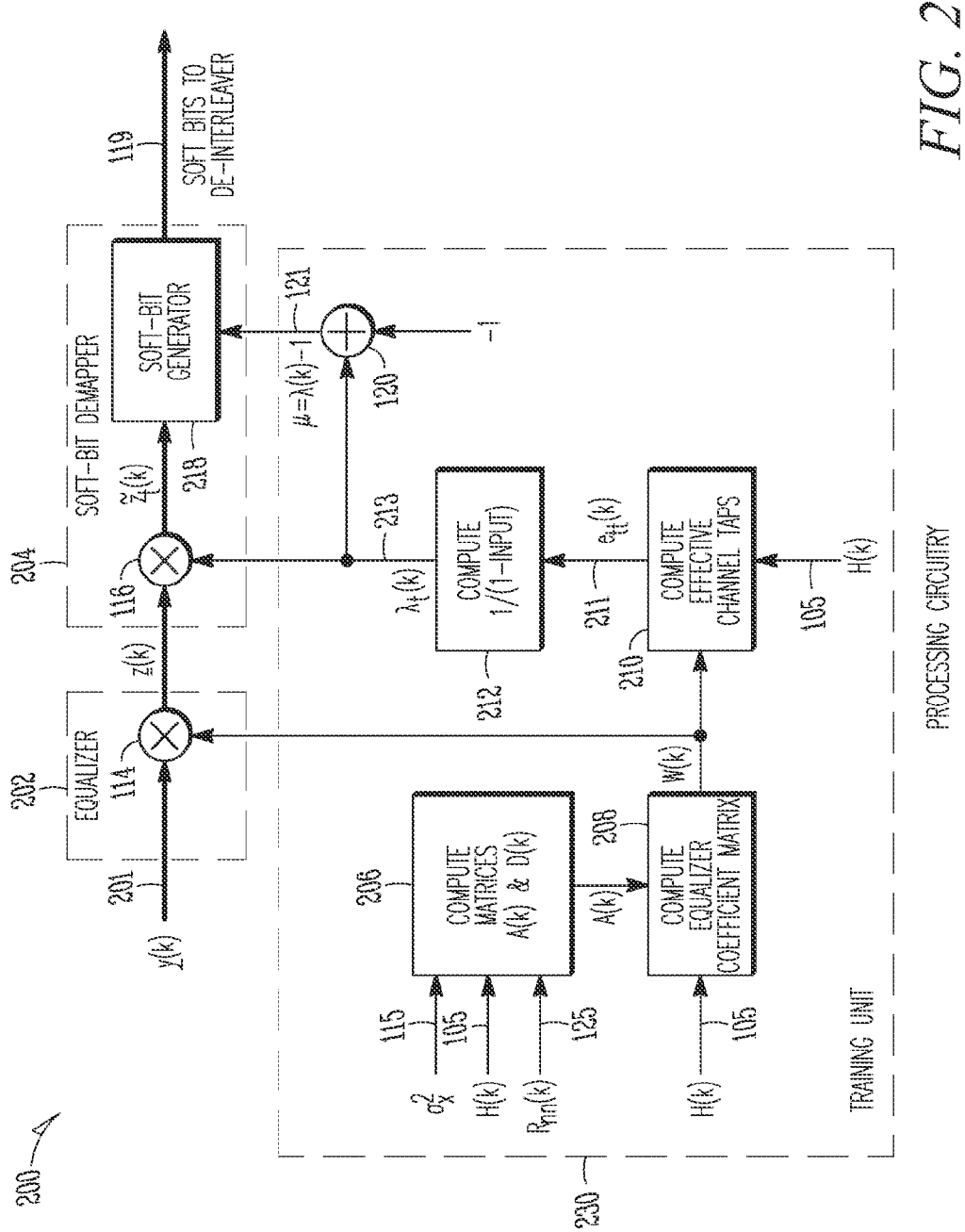
FIG. 2 is a block diagram of processing circuitry for generating soft bits in accordance with some embodiments of the present invention.

FIG. 2 is a block diagram of processing circuitry for generating soft bits in accordance with some embodiments of the present invention. Processing circuitry 200 generates soft bits 119 from frequency domain signals 201. Processing circuitry 200 includes training unit 230, equalizer 202 and soft-bit demapper 204. In some embodiments, equalizer 202 may correspond to equalizer 156 (FIG. 1), soft-bit demapper 204 may correspond to one of soft-bit demappers 160 (FIG. 1), and training unit 230 may correspond to training unit 158 (FIG. 1), although the scope of the invention is not limited in this respect.

In accordance with some embodiments, training unit 230 may provide operational parameters to equalizer 202 and soft-bit demapper 204. In some embodiments, equalizer 202 may be a minimum mean squared error (MMSE) equalizer, although the scope of the invention is not limited in this respect. In some embodiments, the parameters provided to equalizer 202 and soft-bit demapper 204 include W(k), $\lambda_t(k)$, and $\lambda_t(k)-1$, which is also referred to herein as $\mu_t(k)$.

In some embodiments, training unit 230 may include four computational units 206, 208, 210, and 212. Computational units 206, 208, 210, and 212 may include one or more circuits for multiplying, dividing, adding, and subtracting, in order to carry out the calculations described below. Computational units 206, 208, 210, and 212 may also include look-up tables, as may be useful in the case of performing reciprocation, for example. Computational units 206, 208, 210, and 212 may also be embodied as software or firmware code stored in a medium (such as a memory device) in some embodiments.

In some embodiments, first computational unit 206 may compute two matrices, A(k) and D(k), based upon three inputs, $\sigma_x^2$, H(k), and $R_{nn}(k)$. The variable k represents the tone index. Thus, many of the values depicted and/or discussed herein may vary from tone to tone, and may be calculated individually for each tone employed by the communication system, although the scope of the invention is not limited in this respect. For example, W(k) and $\lambda_t$ may vary from tone to tone, and may be calculated separately for each tone employed by the communication system. The discussion herein focuses upon the operation of training unit 230, equalizer 202, and soft-bit demapper 204, as it pertains to a single tone.

In some embodiments, $\sigma_x^2$ represents the average energy of the transmitted subsymbols 115. H(k) represents channel estimate 105, as observed at every tone and receiver antenna. The number of receive signal paths or receive antennas is denoted by R, and the number of transmitted spatial data streams or transmission antennas is denoted by T. H(k) may be an R×T matrix. $R_{nn}(k)$ may be noise correlation matrix 125, which is of dimension R×R. $\sigma_x^2$, H(k), and $R_{nn}(k)$ are inputs that may be provided to training unit 230 with the reception of each packet. Their calculation is well understood by those of ordinary skill in the art of receiver design, and is not discussed herein.

First computational unit 206 may operate by initially calculating D(k), according to the following formula:

$$D(k)=R_{nn}(k)/\sigma_x^2.$$

Optionally, training unit 230 may be designed to assign $\sigma_x^2$ a value of one. Such a design choice reduces complexity, and merely alters the values found in the channel estimate matrix, H(k).

After calculating of D(k), A(k) may be calculated as a function of D(k), based upon the following formula:

$$A(k)=H(k)H^{\dagger}(k)+D(k),$$

where $H^{\dagger}(k)$ represents the conjugate transpose matrix of H(k). After calculation of A(k), this value may be provided to second computational unit 208. Second computational unit 208 may use the A(k) matrix to calculate equalizer coefficient matrix W(k) which may be based upon the following formula:

$$W(k)=H^{\dagger}(k)A^{-1}(k),$$

where $A^{-1}(k)$ represents the inverse matrix of A(k).

Second computational unit 208 may provide equalizer coefficient matrix W(k) to equalizer 202. Upon reception of equalizer coefficient matrix W(k), equalizer 202 may be said to be trained or initialized. Equalizer 202 may include matrix multiplication unit 114, which may include one or more circuits for multiplying, adding, and subtracting, in order to carry out the computations described below. Matrix multiplication unit 114 may also be embodied as software or firmware code stored in a medium (such as a memory device) in some embodiments. During operation, equalizer 202 may pre-multiply $\underline{y}(k)$ by W(k), yielding $\underline{z}(k)$, where $\underline{y}(k)$ is an R-dimensional vector containing complex numbers representing frequency content observed on a given tone, k, at each of the R reception antennas. $\underline{y}(k)$ may be provided to equalizer 202 by a set of R FT units. The values in $\underline{y}(k)$ may be distorted by cross-talk and background noise, among other things.

Multiplying $\underline{y}(k)$ by W(k) to generate $\underline{z}(k)$ may produce a T-dimensional vector, representing, for a given tone, k, the frequency content that equalizer 202 calculates was emitted from each of the T transmission antennas. For example, $z_1(k)$ represents the frequency content that equalizer 202 calculates was emitted on tone k from the first transmission antenna (or the first spatial channel). Similarly, $z_2(k)$ represents the frequency content that equalizer 202 calculates was emitted on tone k from the second transmission antenna (or the second spatial channel), and so on. Thus, multiplication of $\underline{y}(k)$ by the equalizer coefficient matrix, W(k), approximately removes the effects of cross-talk and noise.

After calculation of $\underline{z}(k)$, the values from this vector may be provided to each of T soft-bit demappers 204 (only one of which is shown in FIG. 2). The operation of soft-bit demapper 204 is discussed in greater detail, below.

In some embodiments, equalizer coefficient matrix W(k) is also provided to third computational unit 210. Third computational unit 210 may yield a T-dimensional vector that includes each of T effective channel taps 211, shown as $e_{tt}(k)$. The vector yielded from third computational unit 210 may be of the following nature: $<e_{11}(k), e_{22}(k), \ldots e_{TT}(k)>$, where $e_{tt}(k)$ represents an entry on the diagonal of the effective channel matrix, E(k), which may be calculated as:

$$E(k)=W(k)H(k)$$

For example, $e_{11}(k)$ may represent the element in the first row and first column of E(k), and $e_{22}(k)$ may represent the element in the second row and second column therein. Notably, the output of third computational unit 210 requires only the diagonal elements of the effective channel matrix E(k) to be calculated ($e_{11}(k)$, $e_{22}(k)$, etc.), as opposed to calculating each element in E(k). Conventional methods of training a soft-bit demapper may require computation of every element in E(k). Since E(k) is a T×T matrix, the conventional method requires the calculation of $T^2$ elements. On the other hand, in accordance with some embodiments, training soft-bit demapper 204 may require only the calculation of the diagonal elements of E(k). In some embodiments, only T elements need to be calculated. Consequently, the off-diagonal elements of the effective channel matrix E(k) do not need to be calculated. This may result in a significant reduction in the complexity of training unit 230.

In some embodiments, each of the effective channel taps $e_{tt}(k)$ 211 may be provided to fourth computational unit 212, which may compute output 213. Output 213 may be equal to $1/(1-e_{tt}(k))$, for each effective channel tap provided thereto. The value yielded from fourth computational circuit 212 is termed $\lambda_t(k)$. In some embodiments, fourth computational circuit 212 may compute output 213 using the following equation:

$\lambda_t(k)=1/(1-e_{tt}(k))$.

In some embodiments, fourth computational unit 212 may be a reciprocation circuit or a look-up table, among other things. In some embodiments, output 213 from fourth computational unit 212 may be provided to each soft-bit demapper 204, only one of which is depicted in FIG. 2. For example, $\lambda_1(k)$ may be provided to a soft-bit demapper corresponding to the first spatial channel, $\lambda_2(k)$ may be provided to a soft-bit demapper corresponding to the second spatial channel, and so on. The value from fourth computational unit 212 may be provided to multiplication unit 116, which may be an element-wise multiplication unit and may be part of soft-bit demapper 204, although the scope of the invention is not limited in this respect.

In some embodiments, the element-wise multiplication performed by multiplication unit 116 may multiply the t-th element of $\underline{z}(k)$ by $\lambda_t(k)$. In other words, $z_1(k)$ is multiplied by $\lambda_1(k)$ in a soft-bit demapper corresponding to the first spatial channel. Similarly, $z_2(k)$ is multiplied by $\lambda_2(k)$ in a soft-bit demapper corresponding to a second spatial channel, and so on. Thus, $\lambda_t(k)$ may be applied as a soft-bit weight, which is a function of spatial channel and tone. The resulting product is termed $\tilde{z}_t(k)$, which is provided to soft-bit generator 218, the operation of which is discussed below.

The output of fourth computational unit 212 may also be provided to adder unit 120, yielding output 121 of $\lambda_t(k)-1$, which is termed $\mu_t(k)$. Soft-bit generator 218 may calculate a set of soft bits for a given tone, k, and spatial channel, t, based upon $\tilde{z}_t(k)$ and $\mu_t(k)$. For example, assuming that the transmission system employed a modulation scheme of 16-QAM (quadrature amplitude modulation), then soft-bit generator 218 may yield four soft bits which may be calculated as follows:

Soft bit$_1$=Re$\{\tilde{z}_t(k)\}$

Soft bit$_2$=$(2\sigma_x/10^{1/2})\cdot\mu_t(k)$−abs(soft bit$_1$)

Soft bit$_3$=Im$\{\tilde{z}_t(k)\}$

Soft bit$_4$=$(2\sigma_x/10^{1/2})\cdot\mu_t(k)$−abs(soft bit$_3$)

The number of soft bits 119 generated by soft-bit generator 218 may depend on the modulation level used by the transmitting station. For example, when binary phase shift keying (BPSK) is employed, one soft bit per symbol is generated, when quadrature phase shift keying (QPSK) is employed, two soft bits per symbol are generated, when 8PSK is employed, three soft bits per symbol are generated, when 16-quadrature amplitude modulation (16-QAM) is employed, four soft bits per symbol are generated, when 32-QAM is employed, five soft bits per symbol are generated, when 64-QAM is employed, six soft bits per symbol are generated, when 128-QAM is employed, seven soft bits per symbol are generated, and when 256-QAM is employed, eight soft bits per symbol are generated. Soft-bit generator 218 may generate a greater number of soft bits per symbol when higher data communication rates per subcarrier are employed by the transmitter. Irrespective of the modulation technique employed by the communication system, soft-bit generator 218 generates soft bits 119 based on $\tilde{z}_t(k)$ and $\mu_t(k)$.

The techniques described above for generating the operational parameters for equalizer 202 and demapper 204 may result in a reduction of complexity, when compared to more conventional techniques. For example, in a conventional three-transmission antenna and four-reception antenna system, training may require approximately: (1) 265 complex multiplications and 7 real division operations, assuming spatially correlated receiver noise; (2) 229 complex multiplications and 7 real division operations, assuming spatially uncorrelated noise, unequal from receiver antenna to receiver antenna; and (3) 220 complex multiplications and 7 real division operations, assuming spatially uncorrelated noise, equal from receiver antenna to receiver antenna. In accordance with some embodiments of the present invention, training unit 230 may train equalizer 202 and demapper 204 in approximately 172 complex multiplications and 7 real divisions, regardless of whether the noise is correlated or uncorrelated. Furthermore, (again in the context of a three-transmission antenna and four-reception antenna system) a conventional equalizer and demapper may require approximately 33 complex multiplications to perform their above-recited operations. In accordance with some embodiments of the present invention, processing circuitry 200, on the other hand, may require only approximately 15 complex multiplications.

Figure 3:
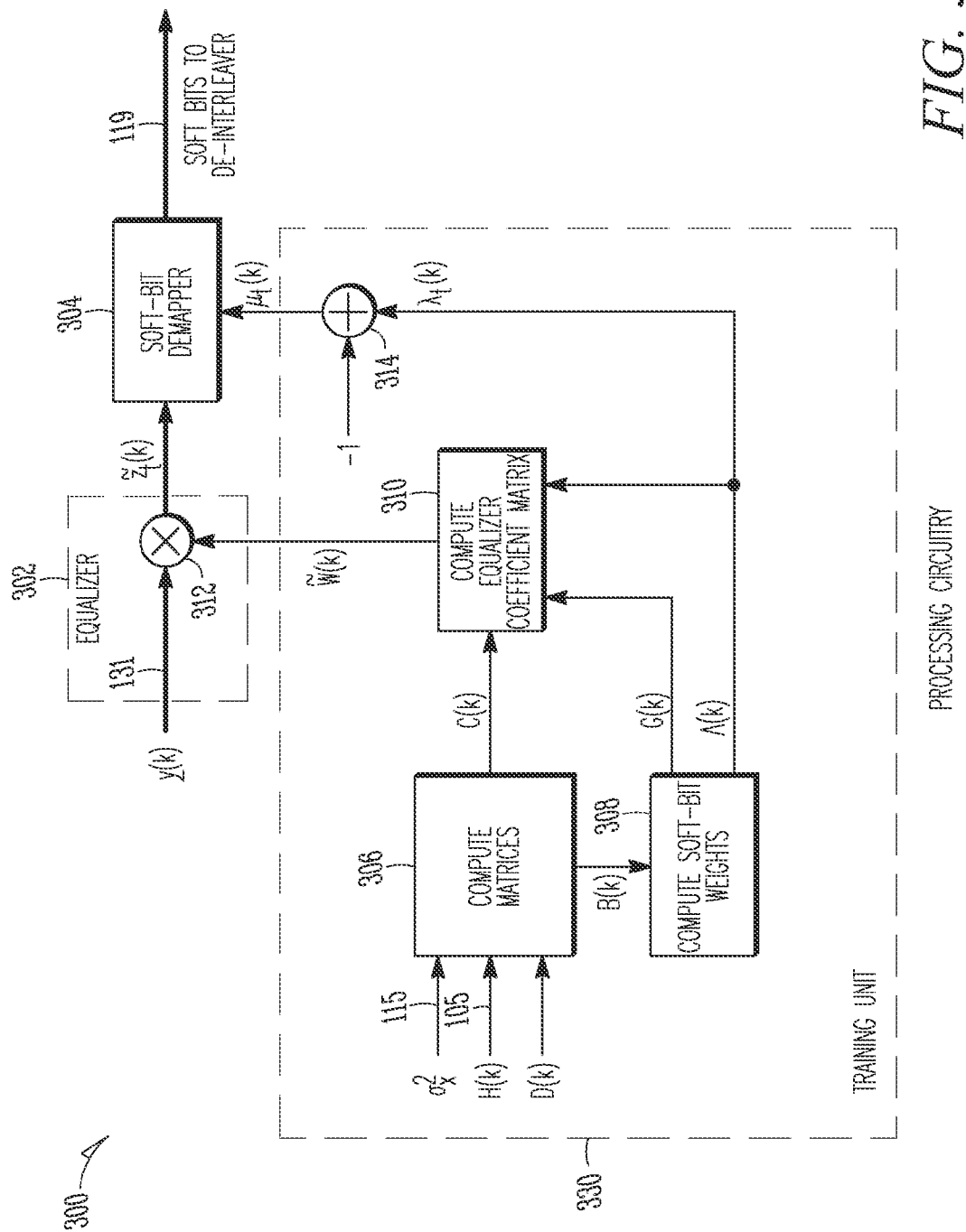
FIG. 3 is a block diagram of processing circuitry for generating soft bits in accordance with some other embodiments of the present invention.

FIG. 3 is a block diagram of processing circuitry for generating soft bits in accordance with some other embodiments of the present invention. Processing circuitry 300 includes training unit 330, equalizer 302 and soft-bit demapper 304. In some embodiments, equalizer 302 may correspond to equalizer 156 (FIG. 1), soft-bit demapper 304 may correspond to one of soft-bit demappers 160 (FIG. 1), and training unit 330 may correspond to training unit 158 (FIG. 1), although the scope of the invention is not limited in this respect. Training unit 330 provides operational parameters to equalizer 302 and soft-bit demapper 304. The parameters provided to equalizer 302 and soft-bit demapper 304 may include $\tilde{W}(k)$ and $\lambda_t(k)-1$, which may also be referred to herein as $\mu_t(k)$. Based upon these parameters, equalizer 302 and demapper 304 may carry out the functions described above, and described in greater detail herein.

As illustrated in FIG. 3, soft-bit demapper 304 does not include an element-wise multiplication unit for application of soft-bit weights 213 (FIG. 2) (as was the case in FIG. 2, for example). Instead, equalization and application of soft-bit weights may be accomplished via multiplication unit 312 in equalizer 302. Sometimes, a design choice to reduce operational complexity by combining multiple multiplication steps into a single step increases training complexity. In these embodiments, the operational complexity and training complexity are both reduced by performing such a combination.

In these embodiments, training unit 330 includes three computational units 306, 308, and 310. Computational units 306, 308, and 310 may include one or more circuits for multiplying, dividing, adding, and subtracting, in order to carry out the calculations described below. Computational units 306, 308, and 310 may also include look-up tables, as may be useful in the case of performing reciprocation, for example. Computational units 306, 308, and 310 may also be embodied as software or firmware code stored in a medium (such as a memory device) in some embodiments.

First computational unit 306 calculates two matrices, B(k) and C(k), based upon three inputs, $\sigma_x^2$, H(k), and D(k). Thus, many of the values depicted and/or discussed herein may vary from tone to tone, and are calculated individually for each tone employed by the communication system. For example, $\tilde{W}(k)$ and $\mu_t(k)$ vary from tone to tone, and may be calculated separately for each tone employed by the communication system. The discussion herein focuses upon the operation of training unit 330, equalizer 302, and soft-bit demapper 304, as it pertains to a single tone. The inputs to first computational units 306 may be defined as follows. $\sigma_x^2$ represents the average energy of the transmitted subsymbols. H(k) represents the channel estimate, as observed at every tone and receiver antenna. The total number of receiver antennas may be denoted by the variable R, and the total number of transmission antennas used by a transmitting station is denoted by the variable T. H(k) is an R×T matrix. Finally, D(k) is defined as $R_{nn}(k)/\sigma_x^2$, where $R_{nn}(k)$ is the noise correlation matrix, which is of dimension R×R. Training unit 330 may be designed to assign $\sigma_x^2$ a value of one. Such a design choice reduces complexity, for example, by simplifying D(k) to equal $R_{nn}(k)$, thereby eliminating a division operation, and may alter the values found in the channel estimate matrix, H(k).

First computational unit 306 may operate by initially calculating C(k), according to the following formula:

$$C(k)=H^\dagger(k)D^{-1}(k)$$

Notably, the process of finding the inverse of D(k) may be simplified, depending upon the statistical characteristics of the noise. If the noise is uncorrelated, then D(k) is a diagonal matrix (i.e., its non-diagonal elements equal zero), meaning that its inverse can be found by reciprocating the diagonal elements. In FIG. 3, complexity reduction is achieved whether or not the noise is correlated, but is particularly suited to application in an environment in which noise is uncorrelated between the various R antennas.

By finding the inverse matrix of D(k), the training parameter $\tilde{W}(k)$ may be arrived at with the necessity of finding of only one other inverse matrix. As will be seen below, the additional inverse matrix to be found is of the dimension T×T, in comparison to the operations performed by training unit 230 (FIG. 2), for example, which shows that an inverse of an R×R matrix (i.e., A(k)) may be found in the process of calculating W(k). When R≧T, the process performed by training unit 230 (FIG. 2) may require the finding of an inverse matrix that is of a dimension greater than the process performed by training unit 330. This may help reduce the complexity of processing circuitry 300 as compared to processing circuitry 200 (FIG. 2).

C(k) may be supplied to third computational unit 310, the operation of which is discussed below, and first computational unit 306 calculates B(k) according to the following formula:

$$B(k)=C(k)H(k)+I_T,$$

where $I_T$ represents an identity matrix of dimension T×T. The resulting matrix, B(k) is also a T×T matrix. B(k) is supplied to second computational unit 308.

Second computational unit 308 performs the task of finding the inverse of B(k), which is referred to as G(k). Since B(k) is a T×T matrix, a reduction in complexity is realized in second computational unit 308, as described above. G(k) is supplied to third computational unit 310.

The reciprocal of the diagonal elements in G(k) yield the $\lambda_t(k)$ values described with reference to FIG. 2. In other words, $1/g_{11}(k)=\lambda_1(k)$, $1/g_{22}(k)=\lambda_2(k)$, and so on. Second computational unit 308 constructs a T×T matrix, Λ(k), by inserting $\lambda_t(k)$ in its diagonal positions (e.g., $\lambda_1(k)$ is inserted in the first row and first column, $\lambda_2(k)$ is inserted in the second row and second column, and so on), while all non-diagonal elements are assigned a value of zero. Second computational unit 308 also supplies Λ(k) to the third computational unit.

Third computational unit 310 multiplies its three inputs, to yield $\tilde{W}(k)$, based on the following equation:

$$\tilde{W}(k)=\Lambda(k)G(k)C(k)$$

$\tilde{W}(k)$ is then supplied by third computational unit 310 to equalizer 302. Upon having received $\tilde{W}(k)$, equalizer 302 is said to have been trained or initialized. Equalizer 302, may be a MMSE equalizer and may include matrix multiplication unit 312. Matrix multiplication unit 312 may include one or more circuits for multiplying, adding, and subtracting, in order to carry out the calculations described below. Matrix multiplication unit 312 may also be embodied as software or firmware code stored in a medium (such as a memory device) in some embodiments. During operation, equalizer 302 may multiply $\underline{y}(k)$ by $\tilde{W}(k)$, yielding $\underline{\tilde{z}}(k)$, where $\underline{y}(k)$ is an R-dimensional vector containing complex numbers representing frequency content observed on a given tone, k, at each of the R reception antennas. $\underline{y}(k)$ is provided to equalizer 302 by a set of R Fourier transform circuitry 154 (FIG. 1), for example. The values of $\underline{y}(k)$ may be distorted by the dual forces of cross-talk and background noise.

Since W(k)=G(k)C(k), it can be seen that the effect of matrix multiplication unit 312 is to combine the matrix multiplication process of equalizer 202 (FIG. 2) with the element-wise multiplication of the soft-bit weights by multiplier 116 (FIG. 2) into a single matrix multiplication operation carried out by matrix multiplication unit 312. Thus, the output of matrix multiplication unit 312, $\underline{\tilde{z}}(k)$, is a T-dimensional vector that may be identical to that emanating from element-wise multiplication unit 116 (FIG. 2).

As mentioned above, each of the $\lambda_t(k)$ values generated by second computational unit 308 is provided to adder unit 314, yielding an output of $\lambda_t(k)-1$, which is termed $\mu_t(k)$. Soft-bit demapper 304 may calculate a set of soft bits for a given tone, k, and spatial channel, t, based upon $\tilde{z}_t(k)$ and $\mu_t(k)$. For example, assuming that the transmission system employed a modulation scheme of 16-QAM, then soft-bit demapper 304 yields four soft bits that may be calculated as described with reference to FIG. 2. As was the case with respect to processing circuitry 200 (FIG. 2), irrespective of the modulation technique employed by the communication system, soft-bit demapper 304 may generate soft bits having knowledge of $\tilde{z}_t(k)$ and $\mu_t(k)$.

A reduction in complexity may result from the implementation of processing circuitry 300. For example, in the context of a three-transmission antenna and four-reception antenna system, training unit 230 (FIG. 2) can train equalizer 202 (FIG. 2) and demapper 204 (FIG. 2) in approximately 172 complex multiplications and 7 real divisions, regardless of whether the noise is correlated or uncorrelated. However, training unit 330 may be able to train equalizer 302 and demapper 304 in approximately 141 complex multiplications and 6 divisions, assuming correlated noise, and in 105 multiplications and 6 divisions, assuming uncorrelated noise. Furthermore, (again in the context of a three-transmission antenna and four-reception antenna system) equalizer 202 (FIG. 2) and demapper 204 (FIG. 2) may require a total of approximately 15 complex multiplications to perform their above-recited operations. Processing circuitry 300 may require only about 12 complex multiplications.

In some embodiments, the training units of FIGS. 2 and 3 may be configured in accordance with the following principle: the equalizer coefficient matrix, W(k), may be scaled by any value s, without affecting performance, as long as the scale factor s is common to all spatial streams, although the scope of the invention is not limited in this respect. In some embodiments, the scale factor s may vary with the tone index k, which would be designated as s(k), however for notational simplicity, the tone index k will be suppressed herein.

The significance of being able to scale W(k) by a factor, s, is that W(k) may be calculated without the performance of a division operation. In other words, where a division operation would otherwise be required to find a particular element in the equalizer coefficient matrix, W(k), the division may be eliminated, and the divisor may be used as a factor to determine s. In other words, $s=d_1 * d_2 * d_3 \ldots$, where $d_1$, $d_2$, and $d_3$ represent would-be divisors in foregone division operations. The scale factor s may equal the least common multiple of $d_1$, $d_2$, and $d_3$, or may equal any multiple thereof.

When the equalizer coefficient matrix W(k) is scaled by a factor s, the two other operational parameters are affected as follows:

$$\lambda_s = 1/(s-e_s)$$

$$\mu_s = s\lambda_s - 1,$$

where the subscript "s" denotes the "scaled version" of the particular variable. For example, $\lambda_s$ refers to the version of $\lambda_r(k)$ that may be used when $W_s(k)$ is used by the training units of FIGS. 2 and 3, instead of W(k).

Since $\lambda_s$ and $\mu_s$ are calculated differently than $\lambda_r(k)$ and $\mu_r(k)$, the training units of FIGS. 2 and 3 may be modified to implement the above-mentioned formulas for $\lambda_s$ and $\mu_s$, if a scaled version of W(k) is used (i.e., if $W_s(k)$ is used).

Figure 4:
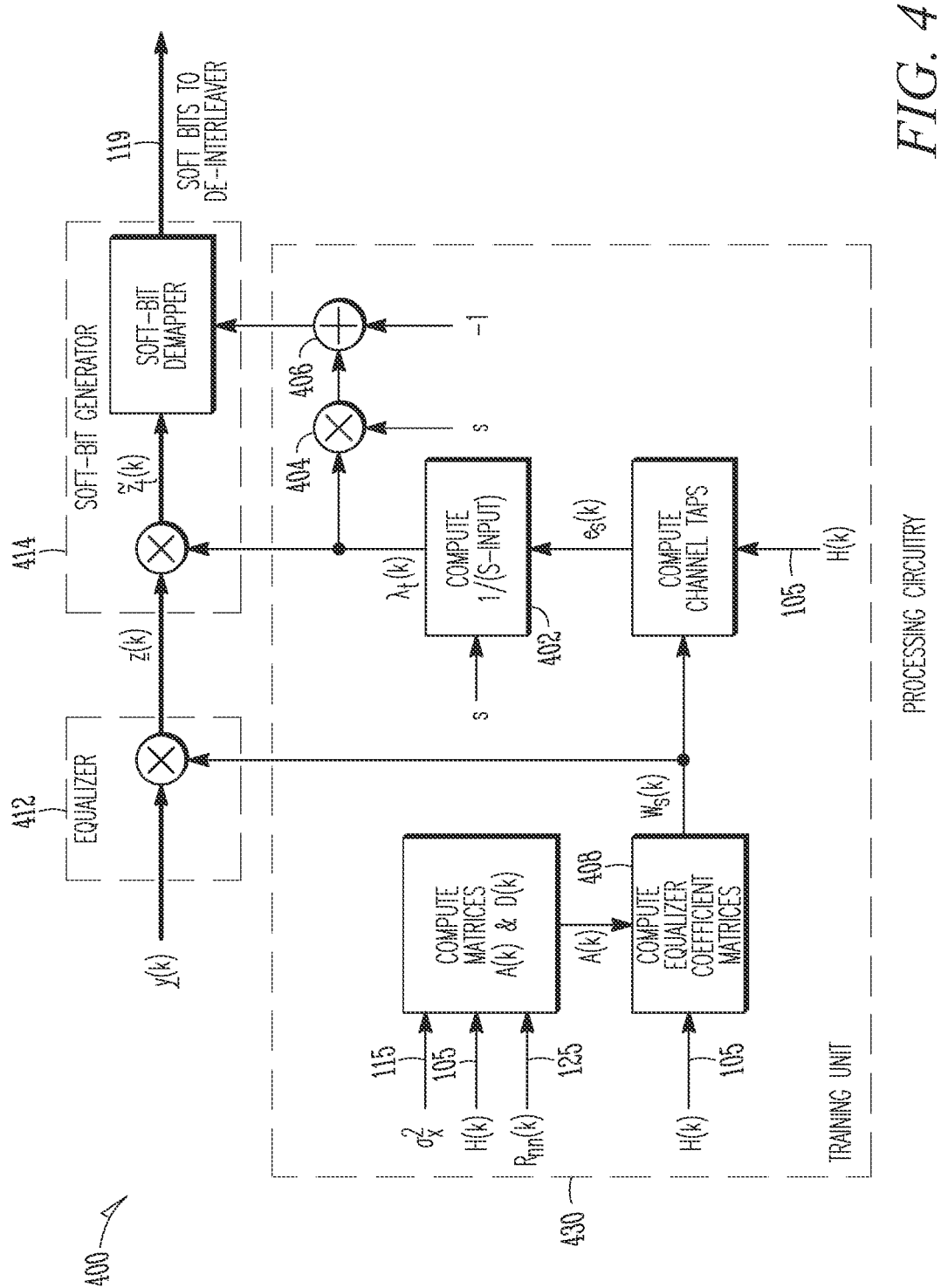
FIG. 4 is a block diagram of processing circuitry for generating soft bits in accordance with some other embodiments of the present invention.

FIG. 4 is a block diagram of processing circuitry for generating soft bits in accordance with some other embodiments of the present invention. Processing circuitry 400 includes training unit 430, equalizer 412 and soft-bit demapper 414. In some embodiments, equalizer 412 may correspond to equalizer 156 (FIG. 1), soft-bit demapper 414 may correspond to one of soft-bit demappers 160 (FIG. 1), and training unit 430 may correspond to training unit 158 (FIG. 1), although the scope of the invention is not limited in this respect. Processing circuitry 400 is modified from processing circuitry 200 (FIG. 2) to use $W_s(k)$, instead of W(k). In some embodiments, processing circuitry 400 may differ from processing circuitry 200 (FIG. 2) in three ways.

First, equalizer calculation unit 408 is configured to produce a scaled version of W(k), $W_s(k)$. $W_s(k)$ is calculated without a division operation, as discussed above. A second difference between processing circuitry 400 and processing circuitry 200 (FIG. 2) is found in fourth computational unit 402. Fourth computational unit 402 is configured to yield 1/(s−input), as opposed to 1/(1−input) as in fourth computational unit 212 (FIG. 2).

Finally, training unit 430 includes multiplication unit 404 interposed between fourth computational unit 402 and addition unit 406. Multiplication unit 404 multiplies the output of fourth computational unit 402 by the scaling factor, s, prior to its delivery to addition unit 406.

Training unit 430 exhibits a reduction in training complexity by using a scaled equalizer coefficient matrix, $W_s(k)$. For example, in the context of a three-transmission antenna and four-reception antenna system, training unit 430 can accomplish training with the use of approximately 96 complex multiplications and approximately 3 division operations, assuming uncorrelated noise.

Figure 5:
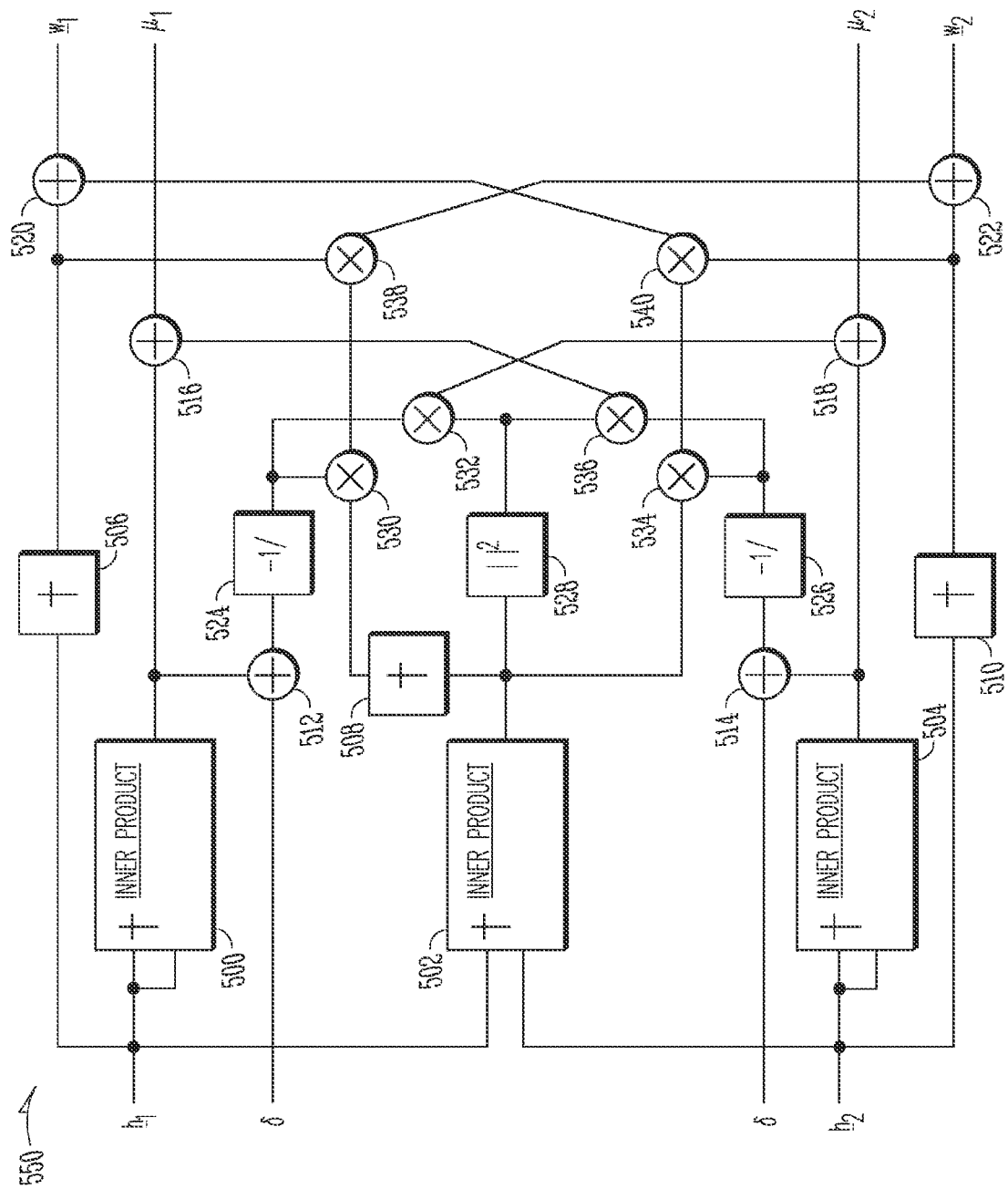
FIG. 5 illustrates a training unit in accordance with some embodiments of the present invention.

FIG. 5 illustrates a training unit in accordance with some embodiments of the present invention. Training unit 550 may be suitable for use as training unit 330 (FIG. 3), although the scope of the invention is not limited in this respect. Training unit 550 is depicted as a training unit that yields $\tilde{W}(k)$ and $\mu_r(k)$ and may be suitable for use in a two-transmitter antenna system, although the scope of the invention is not limited in this respect. In these embodiments, spatially uncorrelated noise may be equal across all receiver antennas. In instances in which the noise is not equal across receiver antennas, one or more multipliers may be used at the output stage of Fourier transform circuitry 154 (FIG. 1) to render equal noise equal across the receiver antennas, causing the effective channel estimate vector to be modified by the value of the multiplier. Training unit 550 may be used to provide the training parameters for equalizer 302 (FIG. 3) and soft-bit demapper 304 (FIG. 3). Because the number of transmitter antennas is fixed at two, each tone has two $\mu_r(k)$ values: $\mu_1$ and $\mu_2$, both of which are functions of tone but notation indicative of this is dropped for the sake of simplicity. $\mu_1$ and $\mu_2$ may comprise $\mu_r(k)$ and may be provided to soft-bit demapper 304 (FIG. 3) as training parameters. Further $\underline{w}_1$ and $\underline{w}_2$ are row vectors, each having a dimension of R. Jointly, $\underline{w}_1$ and $\underline{w}_2$ comprise $\tilde{W}(k)$. Specifically, $\underline{w}_1$ and $\underline{w}_2$ each may constitute a row in the matrix $\tilde{W}(k)$, with $\underline{w}_1$ constituting the first row, and $\underline{w}_2$ constituting the second row. Therefore, $\underline{w}_1$ and $\underline{w}_2$ may be supplied to equalizer 302 (FIG. 3), constituting the training parameter $\tilde{W}(k)$.

Training unit 550 receives three inputs: $\delta, \underline{h}_1$, and $\underline{h}_2$. $\delta$ represents the average energy of the noise ($\sigma_n^2$) divided by $\sigma_x^2$. As discussed above, $\sigma_x^2$ may be defined as one, meaning that $\delta$ may simply equal $\sigma_n^2$. $\underline{h}_1$ and $\underline{h}_2$ are both column vectors of dimension R. $\underline{h}_1$ corresponds to the channel estimate for the first transmission antenna, and $\underline{h}_2$ corresponds to the channel estimate for the second transmission antenna. Jointly, $\underline{h}_1$ and $\underline{h}_2$ may constitute H(k) for a two-transmitter system. $\underline{h}_1$, and $\underline{h}_2$ are functions of tone, but notation indicative of this is dropped for the sake of simplicity.

As can be seen from FIG. 5, training unit 550 includes three inner product modules (generally shown as 500, 502 and 504), three conjugate transpose modules (generally shown as 506, 508 and 510), six adder modules (generally shown as 512, 514, 516, 518, 520 and 522), two negative reciprocating modules 524 and 526, magnitude squaring module 528, and six multiplication modules (generally shown as 530, 532, 534, 536, 538 and 540). Each of the aforementioned modules may be employed in hardware (e.g., as circuits within an ASIC), or may be employed in software or firmware, and may be stored on a medium, such as a memory device.

The various modules of training unit 550 operate as follows. The inner product modules 500-504 may each receive a first and second input vector. Each inner product module 500-504 finds the conjugate transpose of the first input, and performs a matrix multiplication operation upon the conjugate transpose and the second input, yielding an inner product. Conjugate transpose modules 506-510 may each operate to find the conjugate transpose of their input. Six adder modules 512-522 receive first and second inputs, and may yield the sum of the inputs. Two negative reciprocating modules 524 and 526 receive a real-valued input, and yield a negative reciprocal. Magnitude squaring module 528 receives an input, which may be a complex number, and may find the square of its magnitude. Finally, multiplication modules 530-540 may each receive two inputs and yield their product.

As a consequence of the design of training unit 550, and the operation of the modules as just described, the training unit functions so as to find the following training parameters according to the following formulas.

$$\underline{w}_1 = \underline{h}_1^\dagger + (-1/(\underline{h}_2^\dagger \underline{h}_2 + \delta))(\underline{h}_1^\dagger \underline{h}_2)\underline{h}_2^\dagger$$

$$\underline{w}_2 = \underline{h}_2^\dagger + (-1/(\underline{h}_1^\dagger \underline{h}_1 + \delta))(\underline{h}_1^\dagger \underline{h}_2)^* \underline{h}_1^\dagger$$

$$\mu_1 = \underline{h}_1^\dagger \underline{h}_1 + (-1/(\underline{h}_2^\dagger \underline{h}_2 + \delta))|\underline{h}_1^\dagger \underline{h}_2|^2$$

$$\mu_2 = \underline{h}_2^\dagger \underline{h}_2 + (-1/(\underline{h}_1^\dagger \underline{h}_1 + \delta))|\underline{h}_1^\dagger \underline{h}_2|^2$$

The above described training scheme may exhibit a substantial reduction in complexity. For example, in the context of a two-transmission antenna and four-reception antenna system, the training unit 550 may train equalizer 302 (FIG. 3) and demapper 304 (FIG. 3) in approximately 25 complex multiplications and 2 real divisions, as opposed to 158 complex multiplications and 6 real divisions, which may be required by some conventional training techniques.

Some of the complexity reductions are owed to the adjoint of a 2×2 matrix that may easily be determined without the need for multiplications. Additionally, complexity reductions are realized because training unit 550 does not explicitly compute the determinant of $H^{\dagger}(k)H(k)+\delta I_T$.

In training unit 550, multiplication modules 530 and 534 receive as an input the value yielded by their respective reciprocation modules 524 and 526. Thus, multiplication modules 530 and 534 operate in immediate succession to the operation of reciprocation modules 524 and 526. Notably, reciprocation modules 524 and 526 may take a relatively larger number of clock cycles to operate than the other modules (multiplication modules, adding modules, etc.). Thus, depending upon the design of reciprocation modules 524 and 526, multiplication modules 530 and 534 may have to sit idle for one or more clock cycles, awaiting the completion of the operation of reciprocation modules 524 and 526. Such an idle period may protract the training period exhibited by training unit 550.

Figure 6:
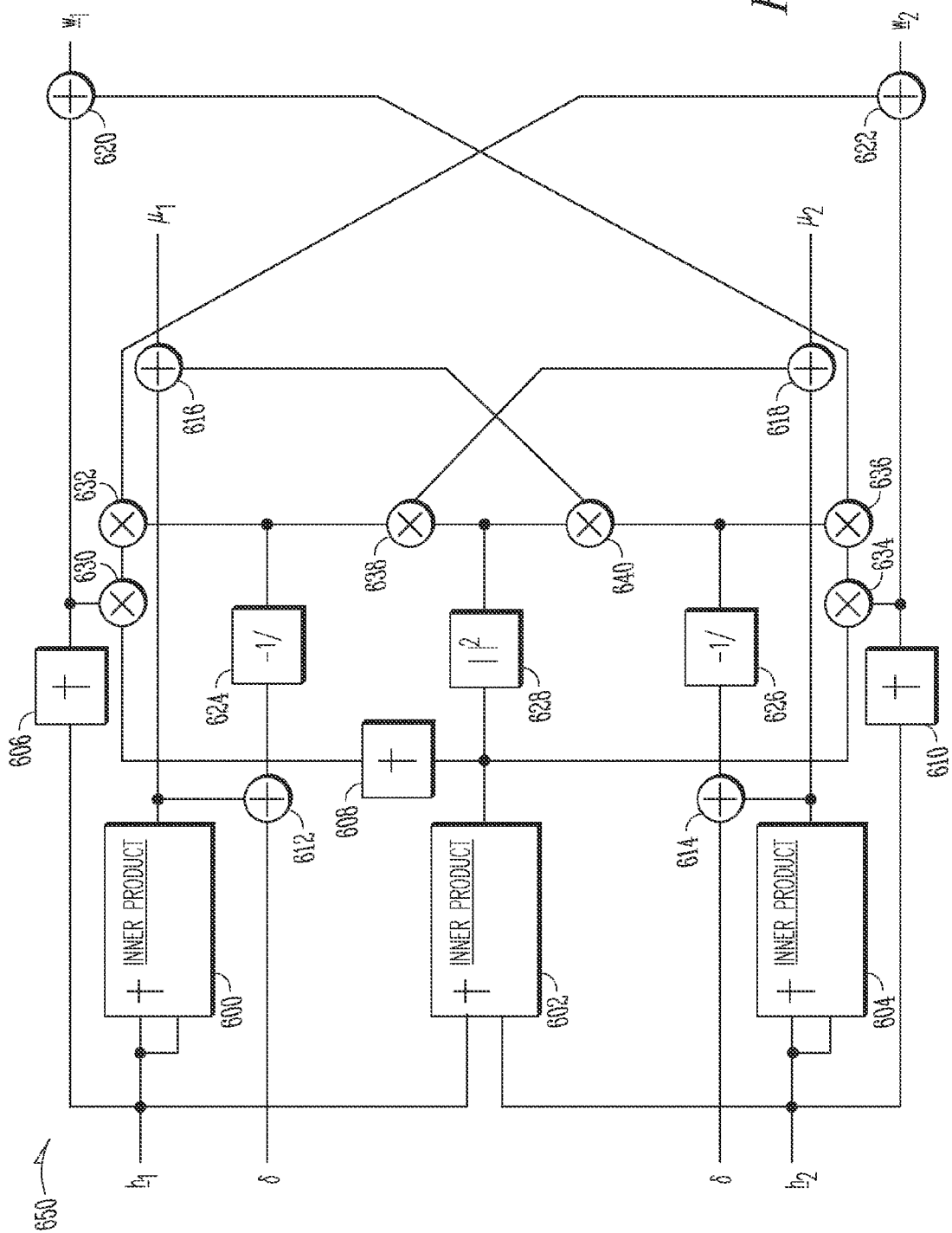
FIG. 6 illustrates a training unit in accordance with some other embodiments of the present invention.

FIG. 6 illustrates a training unit in accordance with some other embodiments of the present invention. Training unit 650 may be suitable for use as training unit 330 (FIG. 3), although the scope of the invention is not limited in this respect. Training unit 650 addresses the potential issue regarding protraction of the training period due to potential idle periods exhibited by multiplication modules 530 (FIG. 5) and 534 (FIG. 5). As can be seen from FIG. 6, training unit 650 includes three inner product modules (generally shown as 600, 602 and 604), three conjugate transpose modules (generally shown as 606, 608 and 610), six adder modules (generally shown as 612, 614, 616, 618, 620 and 622), two negative reciprocating modules 624 and 626, magnitude squaring module 628, and six multiplication modules (generally shown as 630, 632, 634, 636, 638 and 640). Each of the aforementioned modules may be employed in hardware (e.g., as circuits within an ASIC), or may be employed in software or firmware, and may be stored on a medium, such as a memory device.

As can be seen, training unit 650 is similar in structure to training unit 550 (FIG. 5), with some exceptions. Specifically, multiplication modules 538 (FIG. 5) and 540 (FIG. 5) have been relocated to receive one of their inputs from modules 508 (FIG. 5) and 502 (FIG. 5), respectively. Thus, multiplication modules 538 (FIG. 5) and 540 (FIG. 5) are depicted as multiplication modules 630 and 634 in FIG. 6. The rearrangement of multiplication modules 538 and 540 necessitates the relocation of multiplication modules 530 (FIG. 5) and 534 (FIG. 5) to a position immediately successive to multiplication modules 630 and 634. The effect of these two modifications is that multiplication modules 630 and 634 may operate during the same period that reciprocation modules 624 and 626 are operating. For example, $\underline{h}_1^{\dagger}\underline{h}_2$ may be multiplied by $\underline{h}_2^{\dagger}$ in multiplication module 634 while reciprocation module 626 operates. In training unit 550 (FIG. 5), the operation is performed after reciprocation, not at the same time. Therefore, training unit 650 may exhibit a greater degree of parallel operation than does training unit 550 (FIG. 5), resulting in possibly a shorter training period.

Figure 7:
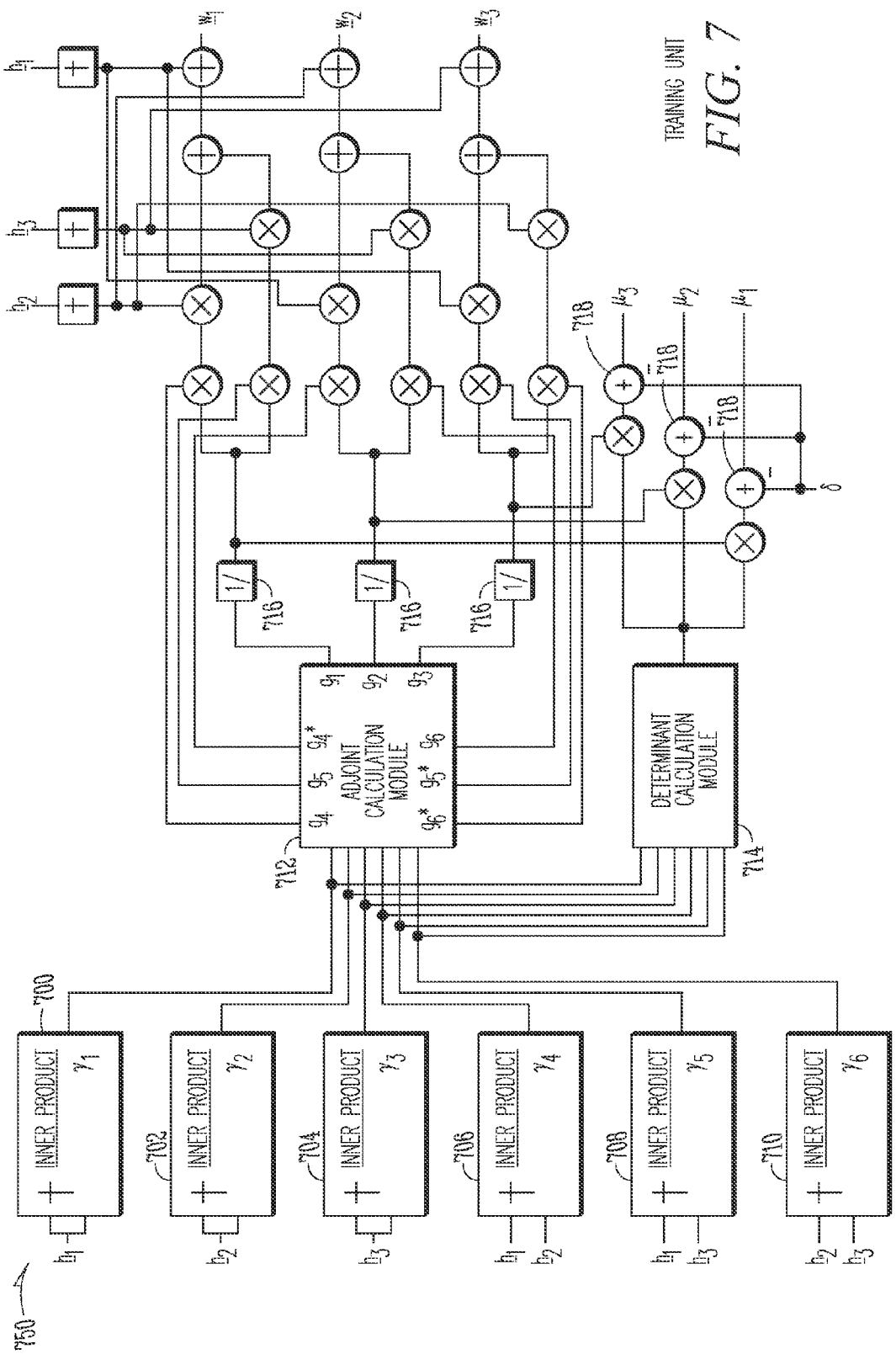
FIG. 7 illustrates a training unit in accordance with some other embodiments of the present invention.

Because of these modifications, the intermediate quantities calculated by training unit 650 may differ from those of training unit 550 (FIG. 5). However, the net effect of training unit 650 is to calculate quantities identical to those of training unit 550 (FIG. 5). In other words, in the context of training unit 650, $\underline{w}_1 = \underline{h}_1^{\dagger} + (-1/(\underline{h}_2^{\dagger}\underline{h}_2+\delta))(\underline{h}_1^{\dagger}\underline{h}_2)\underline{h}_2^{\dagger}$ $\underline{w}_2 = \underline{h}_2^{\dagger} + (-1/(\underline{h}_1^{\dagger}\underline{h}_1+\delta))(\underline{h}_1^{\dagger}\underline{h}_2)^*\underline{h}_1^{\dagger}$ $\mu_1 = \underline{h}_1^{\dagger}\underline{h}_1 + (-1/(\underline{h}_2^{\dagger}\underline{h}_2+\delta))|\underline{h}_1^{\dagger}\underline{h}_2|^2$ $\mu_2 = \underline{h}_2^{\dagger}\underline{h}_2 + (-1/(\underline{h}_1^{\dagger}\underline{h}_1+\delta))|\underline{h}_1^{\dagger}\underline{h}_2|^2.$ FIG. 7 illustrates a training unit in accordance with some other embodiments of the present invention. Training unit 750 may be suitable for use as training unit 330 (FIG. 3), although the scope of the invention is not limited in this respect. Training unit 750 may generate $\tilde{W}(k)$ and $\mu_r(k)$ in the context of a three-transmitter antenna system. In these embodiments, spatially uncorrelated noise may be equal across the receiver antennas. When the noise is not equal across receiver antennas, one or more multipliers may be used at the output stage of Fourier transform circuitry 154 (FIG. 1) to render equal noise equal across all receivers, causing the effective channel estimate vector to be modified by the value of the multiplier, although the scope of the invention is not limited in this respect. Training unit 750 may be used to provide the training parameters for equalizer 302 (FIG. 3) and soft-bit demapper 304 (FIG. 3). Because the number of transmitter antennas in these embodiments is fixed at three, there exist three $\mu_r(k)$ values for each tone: $\mu_1$, $\mu_2$ and $\mu_3$, all of which are functions of tone, but notation indicative of this is dropped for the sake of simplicity. Therefore, $\mu_1$, $\mu_2$ and $\mu_3$ constitute $\mu_r(k)$, and may be provided to soft-bit demapper 304 (FIG. 3) as training parameters. Further, it may be understood that $\underline{w}_1$, $\underline{w}_2$ and $\underline{w}_3$ are row vectors, each having a dimension of R. Jointly, $\underline{w}_1$, $\underline{w}_2$ and $\underline{w}_3$ constitute $\tilde{W}(k)$. Specifically, $\underline{w}_1$, $\underline{w}_2$ and $\underline{w}_3$ each constitute a row in the matrix $\tilde{W}(k)$, with $\underline{w}_1$ constituting the first row, $\underline{w}_2$ constituting the second row, $\underline{w}_3$ constituting the third row. Therefore, $\underline{w}_1$, $\underline{w}_2$ and $\underline{w}_3$ may be supplied to equalizer 302 (FIG. 3), constituting the training parameter $\tilde{W}(k)$.

Training unit 750 receives four inputs: $\delta$, $\underline{h}_1$, $\underline{h}_2$ and $\underline{h}_3$. $\delta$ represents the average energy of the noise $(\sigma_n^2)$ divided by $\sigma_x^2$. As discussed above, $\sigma_x^2$ may be defined as one, meaning that $\delta$ may simply equal $\sigma_n^2$. $\underline{h}_1$, $\underline{h}_2$ and $\underline{h}_3$ are column vectors of dimension R. $\underline{h}_1$ corresponds to the channel estimate for the first transmission antenna, $\underline{h}_2$ corresponds to the channel estimate for the second transmission antenna, and $\underline{h}_3$ corresponds to the channel estimate for the third transmission antenna. Jointly, $\underline{h}_1$, $\underline{h}_2$ and $\underline{h}_3$ may constitute $H(k)$ for a three-transmitter system. $\underline{h}_1$, $\underline{h}_2$ and $\underline{h}_3$ are functions of tone, but notation indicative of this is dropped for the sake of simplicity. For the sake of simple illustration, $\underline{h}_1$, $\underline{h}_2$, and $\underline{h}_3$ are each depicted as inputs at three locations in FIG. 7. Each instance of $\underline{h}_1$ refers to the same column vector, each instance $\underline{h}_2$ refers to the same column vector, and each instance of $\underline{h}_3$ refers to the same column vector.

As can be seen from FIG. 7, training unit 750 includes six inner product modules (generally shown as 700, 702, 704, 706, 708 and 710), adjoint calculation module 712, determinant calculation module 714, three reciprocation units 716 (designated with "1/"), fifteen multiplier units (designated with "x"), six adder units (designated with "+"), three difference units 718, and three conjugate transpose modules (designated with "†"). Although FIG. 7 depicts a particular number of modules and units, training unit 750 may include additional or fewer modules and units. Each of the aforementioned modules may be employed in hardware (as circuits within an ASIC), or may be employed in software or firmware, and may be stored on a medium, such as a memory device.

The various modules of training unit 750 operate as follows. Inner product modules 700-710 each receive a first and second input vector. Each inner product module 700-710 finds the conjugate transpose of the first input (depicted as the upper input of training unit 750), and performs a matrix multiplication operation upon the conjugate transpose and the second input (depicted as the lower input of training unit 750), yielding an inner product. The conjugate transpose modules each operate to find the conjugate transpose of their input. The six adder modules receive first and second inputs, and yield the sum of the inputs. The three reciprocating modules 716 receive an input, and yield its reciprocal. The fifteen multiplication modules each receive two inputs, and yield their product. The three difference modules 718 receive first and second inputs, and yield the difference of the inputs.

The output of each inner product modules 700-710 may be termed $\gamma_1$-$\gamma_6$, respectively. Thus the output of inner product module 700 $\underline{h}^\dagger_1 \underline{h}_1$, which is termed $\gamma_1$. Similarly, the output of inner product module 702 is $\underline{h}^\dagger_2 \underline{h}_2$, which is termed $\gamma_2$, and so on. Jointly, inner product modules 700-710 construct quantities sufficient to define the following matrix, noting that $\delta$ is an input value of training unit 750:

$$\begin{bmatrix} \gamma_1+\delta & \gamma_4 & \gamma_5 \\ \gamma_4^* & \gamma_2+\delta & \gamma_6 \\ \gamma_5^* & \gamma_6^* & \gamma_3+\delta \end{bmatrix}$$

The above matrix may be referred to as B for ease of reference. Adjoint calculation module 712 may calculate the adjoint of matrix B. Such calculation is known and is therefore not discussed herein. Adjoint calculation module 712 may include circuits for multiplying, adding, and subtracting, in order to carry out the adjoint calculation.

In some embodiments, adjoint calculation module 712 generates nine values, $g_1, g_2, g_3, g_4, g_5, g_6, g_4^*, g_5^*$, and $g_6^*$, which constitute a matrix, G, which is the adjoint of B:

$$G = \begin{bmatrix} g_1 & g_4 & g_5 \\ g_4^* & g_2 & g_6 \\ g_5^* & g_6^* & g_3 \end{bmatrix}$$

Determinant calculation module 714 calculates the determinant of B, which is termed $\Delta$ herein. Determinant calculation module 714 may include circuits for multiplying, adding, and subtracting, in order to carry out the determinant calculation.

Based on the operations described above, training unit 750 may determine the following training parameters according to the following formulas.

$\underline{w}_1 = \underline{h}_1^\dagger + (g_4/g_1)\underline{h}_2^\dagger + (g_5/g_1)\underline{h}_3^\dagger$ $\underline{w}_2 = \underline{h}_2^\dagger + (g_4^*/g_2)\underline{h}_1^\dagger + (g_6/g_2)\underline{h}_3^\dagger$ $\underline{w}_3 = \underline{h}_3^\dagger + (g_5^*/g_3)\underline{h}_1^\dagger + (g_6^*/g_3)\underline{h}_2^\dagger$ $\mu_1 = \Delta(1/g_1) - \delta$ $\mu_2 = \Delta(1/g_2) - \delta$ $\mu_3 = \Delta(1/g_3) - \delta$ The above described training scheme may exhibit a signification reduction in complexity, although the scope of the invention is not limited in this respect. For example, in some embodiments in the context of a three-transmission antenna and four-reception antenna system, training unit 750 may train equalizer 302 (FIG. 3) and demapper 304 (FIG. 3) in, for example, approximately 72 complex multiplications and approximately 3 real divisions, as opposed to approximately 220 complex multiplications and approximately 7 real divisions required by some conventional training schemes.

Complexity reductions are owed principally to the fact that the adjoint of a 3×3 matrix may be easily determined by finding the cofactor of each element in the 3×3 matrix, and then transposing the matrix, none of which requires a division operation.

To achieve reductions in complexity, in general, it is useful to have a scheme by which a linear matrix equation can be solved without employment of a division operation. For example, in the case of calculating MMSE equalizer matrix (e.g., for training of an MMSE equalizer, such as equalizer 202 (FIG. 2)), $W^\dagger_{MMSE}(k) = (H(k)H^\dagger(k) + (R_{nn}(k)/\sigma_x^2))^{-1} \cdot H(k)$, which is an example of a linear matrix equation. Similarly, in the case of calculating a zero force (ZF) equalizer matrix for training of a ZF equalizer, $W^\dagger_{ZF}(k) = (H^\dagger(k)H(k))^{-1} \cdot H^\dagger(k)$, which is another example of a linear matrix equation.

For either form of equalizer matrix, it is advantageous to solve the linear matrix equations without use of a division operation, because division operations generally take a relatively longer period for execution than do other operations. To accomplish this result, a scaled version of the equalizer matrix may be solved for, as long as other elements of training unit are provided with the scaling factor, as shown and discussed above with reference to FIG. 4.

Both equalizer equations may be generally rewritten as the following form of the following linear matrix equation:

$\Psi \cdot W = \theta$, where $\Psi$ represents a known matrix, such as $H^\dagger(k)H(k)$, W represents an unknown matrix, such as an equalizer matrix that is to be calculated, and $\theta$ represents another known matrix, such as H(k) (or, in the instance of attempting to find an inverse matrix, $I_N$).

For the sake of generality, $$\Psi = \begin{bmatrix} A & B \\ C & D \end{bmatrix},$$

$$W = \begin{bmatrix} P & Q \\ R & S \end{bmatrix},$$

$$\text{and } \theta = \begin{bmatrix} T & V \\ X & Y \end{bmatrix},$$

where A, B, C, D, P, Q, R, S, T, V, X, and Y are matrices. In other words, $\Psi$, W, and $\theta$ are represented as matrices of matrices. Therefore, the problem may be represented as:

$$\begin{bmatrix} A & B \\ C & D \end{bmatrix} \cdot \begin{bmatrix} P & Q \\ R & S \end{bmatrix} = \begin{bmatrix} T & V \\ X & Y \end{bmatrix}$$

By virtue of the above-shown expression of the problem of generally solving a linear matrix equation, the relationship between A, B, C, D, P, Q, R, S, T, V, X, and Y is:

$$A \cdot P + B \cdot R = T \quad \text{Equation (1)}$$

$$A \cdot Q + B \cdot S = V \quad \text{Equation (2)}$$

$$C \cdot P + D \cdot R = X \quad \text{Equation (3)}$$

$$C \cdot Q + D \cdot S = Y \quad \text{Equation (4)}$$

Figure 8:
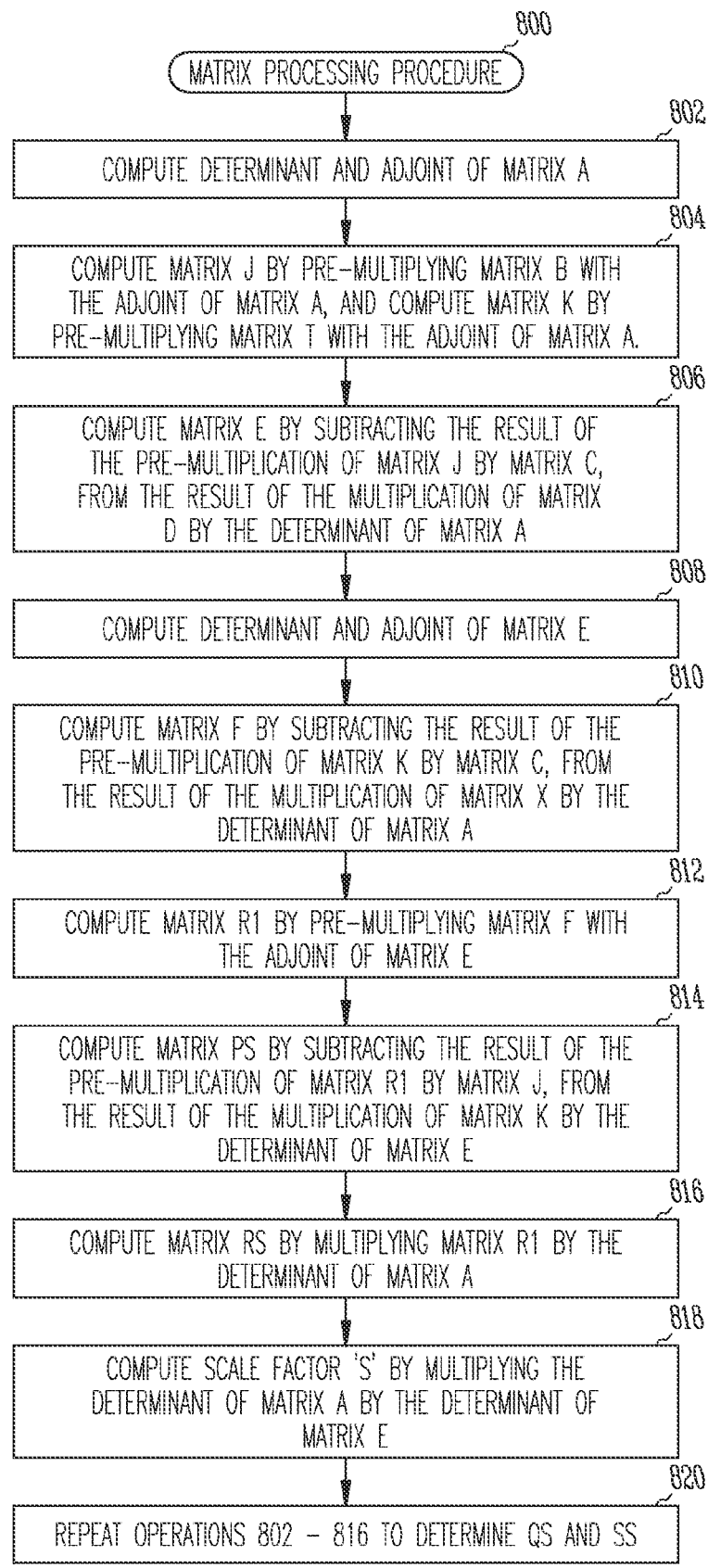
FIG. 8 is a flow chart of a matrix processing procedure in accordance with some embodiments of the present invention.

FIG. 8 is a flow chart of a matrix processing procedure in accordance with some embodiments of the present invention. Matrix processing procedure 800 may be used to find scaled versions of matrices P, Q, R, and S (denoted $P_s$, $Q_s$, $R_s$, and $S_s$), although other procedures may also be used. Operations 802 through 818 of matrix processing procedure 800 illustrate a procedure for finding the scale factor and matrices $P_s$ and $R_s$ and involve manipulation of the Equations (1) and (3) within quadripartite relationship of matrices A, B, C, D, P, Q, R, S, T, V, X, and Y. Operation 820 of matrix processing procedure 800 may be used to find matrices $Q_s$ and $S_s$, and, in that case, involves manipulation of Equations (2) and (4).

Although the description of matrix processing procedure 800 is described as a sequence of mathematical steps, it is understood that a unit of software, or a set of hardware modules may implement matrix processing procedure 800, and that the subjects of manipulation may comprise data values represented by matrices A, B, C, D, P, Q, R, S, T. V, X, and Y. In the context of finding an equalizer matrix, the values being manipulated may include elements within a channel estimate matrix, elements within a conjugate transpose of the channel estimate matrix, and elements making up the noise correlation matrix. By such manipulation, matrices $P_s$, $Q_s$, $R_s$, and $S_s$ may be found without use of a division operation, meaning that an equalizer may be efficiently trained by such a scheme.

Operation 802 comprises computing the determinant and the adjoint of matrix A.

Operation 804 comprises computing matrix J by pre-multiplying matrix B with the adjoint of matrix A, and computing matrix K by pre-multiplying matrix T with the adjoint of matrix A.

Operation 806 comprises computing matrix E by subtracting the result of the pre-multiplication of matrix J by matrix C, from the result of the multiplication of matrix D by the determinant of matrix A.

Operation 808 comprises computing the determinant and the adjoint of matrix E.

Operation 810 comprises computing matrix F by subtracting the result of the pre-multiplication of matrix K by matrix C, from the result of the multiplication of matrix X by the determinant of matrix A.

Operation 812 comprises computing matrix $R_1$ by pre-multiplying matrix F with the adjoint of matrix E.

Operation 814 comprises computing matrix $P_s$ by subtracting the result of the pre-multiplication of matrix $R_1$ by matrix J, from the result of the multiplication of matrix K by the determinant of matrix E.

Operation 816 comprises computing matrix $R_s$ by multiplying matrix $R_1$ by the determinant of matrix A.

Operation 818 comprises computing scale factor s by multiplying the determinant of matrix A by the determinant of matrix E.

Upon the completion of operations 802 through 818, matrices $P_s$ and $R_s$ are determined in terms of matrices A, B, C, D, T and X. Operation 820 comprises repeating operations 802 through 816 to determine the matrices $Q_s$ and $S_s$ in terms of matrices A, B, C, D, V and Y. Operation 820 may include substituting matrix $Q_s$ for matrix $P_s$, matrix $S_s$ for matrix $R_s$, matrix V for matrix T, and matrix Y for matrix X. Upon the completion of procedure 800, the scale factor s and the scaled versions of P, Q, R and S (denoted as $P_s$, $Q_s$, $R_s$, and $S_s$) are known in terms of known matrices A, B, C, D, T, V, X and Y.

In some embodiments, $P_s$, $Q_s$, $R_s$, and $S_s$, may be used as the equalizer coefficient matrices generated by a training unit, such as training unit 158 (FIG. 1), and/or training unit 430 (FIG. 4), although the scope of the invention is not limited in this respect.

The following description may illustrate the derivation of procedure. Initially, Equation (1) is manipulated to find P in terms of a partial scaling factor, the determinant of A:

$$\det(A) \cdot P = -J \cdot R + K, \quad \text{Equation (5)}$$

where $J = \mathrm{adj}(A) \cdot B$ and $K = \mathrm{adj}(A) \cdot T$. Thus, the determinant of A is the first partial scaling factor.

Next, Equation (3) is pre-multiplied by the first partial scaling factor (i.e., the determinant of A), and is simplified, to arrive at an equation for R in terms of a second partial scaling factor:

$$\det(E) \cdot R = \mathrm{adj}(E) \cdot F, \quad \text{Equation (6)}$$

where $E = \det(A) \cdot D - C \cdot J$, and $F = -C \cdot K + \det(A) \cdot X$. Thus, the determinant of E is the second partial scaling factor.

Next, Equation (5) is multiplied by the second partial scaling factor (i.e., the determinant of E) using Equation (6) to arrive at the equation for the scaled version of P:

$$P_s = -J \cdot \mathrm{adj}(E) \cdot F + \det(E) \cdot K, \quad \text{Equation (7)}$$

where the scaling factor, s, can be determined by Equation (8) below:

$$s = \det(A) \cdot \det(e). \quad \text{Equation (8)}$$

Next, Equation (6) is multiplied by the first partial scaling factor (i.e., the determinant of A) to arrive at the equation for the scaled version of R:

$$R_s = \det(A) \cdot \mathrm{adj}(e) \cdot F. \quad \text{Equation (9)}$$

Broadly speaking, matrix processing procedure 800 solves for scaled version of unknowns and the scaling factor. When the solving process calls for calculation of an inverse matrix, the adjoint may be used instead, while the determinant may be identified as a partial scaling factor. At the end, all of the partial scaling factors (i.e., determinants) may be multiplied together to arrive at a final scaling factor.

Using matrix processing procedure 800 to determine $Q_s$, and $S_s$, one obtains:

$$Q_s = -J \cdot \mathrm{adj}(E) \cdot G + \det(E) \cdot L$$

$$S_s = \det(A) \cdot \mathrm{adj}(E) \cdot G,$$

where $L = \mathrm{adj}(A) \cdot V$, and $G = -C \cdot L + \det(A) \cdot Y$.

Although the individual operations of procedure 800 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier receiver that communicates over a plurality of subcarriers and spatial channels, comprising:
    an equalizer to multiply frequency domain signals generated from each of a plurality of receive signal paths by an equalizer coefficient matrix to remove at least some crosstalk and noise to generate spatially equalized frequency domain signals for each subcarrier;
    a soft-bit demapper for each spatial channel to multiply the spatially equalized frequency domain signals by soft-bit weights for use in generating soft bits; and
    a training unit to generate the equalizer coefficient matrix from a noise correlation matrix, a channel estimate matrix and an average energy of transmitted sub-symbols for each subcarrier and to generate the soft-bit weights from effective channel taps,
    wherein the effective channel taps comprise only diagonal elements of an effective channel matrix, and
    wherein the training unit generates the diagonal elements of the effective channel matrix from the equalizer coefficient matrix and the channel estimate matrix.

2. The receiver of claim 1 wherein the receiver receives two or more spatial data streams concurrently through two or more receive antennas, the two or more spatial data streams having been transmitted by a corresponding two or more transmit antennas of a transmitting station.

3. The receiver of claim 2 wherein the multiplication of the spatially equalized frequency domain signals by the soft-bit weights generates soft-bit weighted spatially equalized frequency domain signals, and
    wherein the soft-bit demapper includes a soft-bit generator to generate the soft bits from the soft-bit weighted spatially equalized frequency domain signals, values proportional to the soft-bit weights, and a square root of transmit sub-symbol energy, and
    wherein a number of soft bits generated by the soft-bit demapper depends on a modulation level used by the transmitting station.

4. The receiver of claim 2 wherein the training unit generates the equalizer coefficient matrix for each subcarrier of a received multicarrier signal for each received packet from training information in each received packet.

5. The receiver of claim 1 wherein the soft bits comprise real values representing a confidence level for a corresponding hard-bit.

6. A multicarrier receiver that communicates over a plurality of subcarriers and spatial channels, comprising:
    an equalizer to multiply frequency domain signals generated from each of a plurality of receive signal paths by an equalizer coefficient matrix to remove at least some crosstalk and noise to generate spatially equalized frequency domain signals for each subcarrier;
    a soft-bit demapper for each spatial channel to multiply the spatially equalized frequency domain signals by soft-bit weights for use in generating soft bits; and
    a training unit to generate the equalizer coefficient matrix for each subcarrier and to generate the soft-bit weights from effective channel taps,
    wherein the receiver receives two or more spatial data streams concurrently through two or more receive antennas, the two or more spatial data streams having been transmitted by a corresponding two or more transmit antennas of a transmitting station,
    wherein the training unit generates the equalizer coefficient matrix from a noise correlation matrix, a channel estimate matrix and an average energy of transmitted sub-symbols,
    wherein the training unit generates a scaled version of the equalizer coefficient matrix using a scale factor,
    wherein the scaled version of the equalizer coefficient matrix is used to compute the effective channel taps,
    wherein the soft-bit weights are computed by reciprocating a result of subtracting the corresponding effective channel taps from the scale factor, and
    wherein operational parameters for the soft-bit demappers are calculated by subtracting one from the result of multiplication of the soft-bit weights by the scale factor.

7. A multicarrier receiver that communicates over a plurality of subcarriers and spatial channels, comprising:
    an equalizer to multiply frequency domain signals generated from each of a plurality of receive signal paths by an equalizer coefficient matrix to remove at least some crosstalk and noise to generate spatially equalized frequency domain signals for each subcarrier;
    a soft-bit demapper for each spatial channel to multiply the spatially equalized frequency domain signals by soft-bit weights for use in generating soft bits; and
    a training unit to generate the equalizer coefficient matrix for each subcarrier and to generate the soft-bit weights from effective channel taps, wherein the training unit generates the soft-bit weights from a channel estimate matrix, an average energy of transmitted sub-symbols, and a matrix related to a noise correlation matrix,
    wherein the training unit calculates a set of operational parameters for the equalizer,
    wherein the training unit calculates a set of operational parameters for the soft-bit demappers based on diagonal elements of an effective channel matrix without the use of non-diagonal elements in the effective channel matrix,
    wherein the effective channel taps comprise only the diagonal elements of the effective channel matrix, and wherein the training unit generates the diagonal elements of the effective channel matrix from the equalizer coefficient matrix and the channel estimate matrix.

8. A multicarrier receiver that communicates over a plurality of subcarriers and spatial channels, comprising:

an equalizer to multiply frequency domain signals generated from each of a plurality of receive signal paths by an equalizer coefficient matrix to remove at least some crosstalk and noise to generate spatially equalized frequency domain signals for each subcarrier;

a soft-bit demapper for each spatial channel to multiply the spatially equalized frequency domain signals by soft-bit weights for use in generating soft bits; and a training unit to generate the equalizer coefficient matrix for each subcarrier and to generate the soft-bit weights from effective channel taps, wherein the training unit calculates a first set of operational parameters for the equalizer, wherein the training unit calculates a second set of operational parameters for the soft-bit demappers based on diagonal elements of an effective channel matrix without the use of non- diagonal elements in the effective channel matrix, wherein when calculating the second set of operational parameters, the training unit finds a set of reciprocals, each member of the set of reciprocals being a reciprocal of the difference between one and each diagonal entry in the effective channel matrix, and wherein when calculating the second set of operational parameters, the training unit further subtracts a value of one from each reciprocal in the set of reciprocals to yield the second set of operational parameters for the soft-bit demappers.

9. A multicarrier receiver that communicates over a plurality of subcarriers and spatial channels, comprising:

an equalizer to multiply frequency domain signals generated from each of a plurality of receive signal paths by an equalizer coefficient matrix to remove at least some crosstalk and noise to generate spatially equalized frequency domain signals for each subcarrier;

a soft-bit demapper for each spatial channel to multiply the spatially equalized frequency domain signals by soft-bit weights for use in generating soft bits; and a training unit to generate the equalizer coefficient matrix for each subcarrier and to generate the soft-bit weights from effective channel taps, wherein the training unit calculates a set of operational parameters for the equalizer, and wherein the training unit calculates a set of operational parameters for the soft-bit demappers based on diagonal elements of an effective channel matrix without the use of non-diagonal elements in the effective channel matrix, wherein the training unit:

calculates a matrix C(k) by premultiplying an inverse of a normalized noise correlation matrix D(k) by a conjugate transpose of the channel estimate matrix;

calculates a matrix B(k) by adding an identity matrix to the result of the premultiplying of the channel estimate matrix by the matrix C(k);

computes a matrix G(k) by inverting the matrix B(k); and computes the soft-bit weights by reciprocating corresponding diagonal elements of the matrix G(k), wherein the identity matrix has a dimension equal to a number of transmit antennas, wherein a diagonal soft-bit weight matrix has elements corresponding to the soft-bit weights, and wherein the equalizer coefficient matrix is computed by premultiplying the result, of premultiplying matrix C(k) by matrix G(k), by the diagonal soft-bit weight matrix.

10. A multicarrier that communicates over a plurality of subcarriers and spatial channels, receiver comprising:

an equalizer to multiply frequency domain signals generated from each of a plurality of receive signal paths by an equalizer coefficient matrix to remove at least some crosstalk and noise to generate spatially equalized frequency domain signals for each subcarrier;

a soft-bit demapper for each spatial channel to multiply the spatially equalized frequency domain signals by soft-bit weights for use in generating soft bits; and a training unit to generate the equalizer coefficient matrix for each subcarrier and to generate the soft-bit weights from effective channel taps, wherein the receiver receives two or more spatial data streams concurrently through two or more receive antennas, the two or more spatial data streams having been transmitted by a corresponding two or more transmit antennas of a transmitting station, wherein the transmitting station transmits with two transmit antennas and the receiver receives with at least two receive antennas, wherein the training unit comprises a plurality of inner product modules, a plurality of conjugate transpose modules, a plurality of adder modules, a plurality of negative reciprocating modules, a magnitude squaring module and a plurality of multiplication modules, and wherein each inner product module receives first and second vector inputs, computes a conjugate transpose of the first vector input, and performs a matrix multiplication on the conjugate transpose and the second vector input to yield an inner product.

11. A multicarrier receiver that communicates over a plurality of subcarriers and spatial channels, comprising:

an equalizer to multiply frequency domain signals generated from each of a plurality of receive signal paths by an equalizer coefficient matrix to remove at least some crosstalk and noise to generate spatially equalized frequency domain signals for each subcarrier;

a soft-bit demapper for each spatial channel to multiply the spatially equalized frequency domain signals by soft-bit weights for use in generating soft bits; and a training unit to generate the equalizer coefficient matrix for each subcarrier and to generate the soft-bit weights from effective channel taps, wherein the receiver receives two or more spatial data streams concurrently through two or more receive antennas, the two or more spatial data streams having been transmitted by a corresponding two or more transmit antennas of a transmitting station, wherein the transmitting station transmits with two transmit antennas and the receiver receives with at least two receive antennas, wherein the training unit comprises a plurality of inner product modules, a plurality of conjugate transpose modules, a plurality of adder modules, a plurality of negative reciprocating modules, a magnitude squaring module, and a plurality of multiplication modules, and wherein the multiplication modules and the reciprocating units are arranged to operate concurrently.

12. A multicarrier that communicates over a plurality of subcarriers and spatial channels, receiver comprising:

an equalizer to multiply frequency domain signals generated from each of a plurality of receive signal paths by an equalizer coefficient matrix to remove at least some crosstalk and noise to generate spatially equalized frequency domain signals for each subcarrier;

a soft-bit demapper for each spatial channel to multiply the spatially equalized frequency domain signals by soft-bit weights for use in generating soft bits; and a training unit to generate the equalizer coefficient matrix for each subcarrier and to generate the soft-bit weights from effective channel taps, wherein the receiver receives two or more spatial data streams concurrently through three or more receive antennas, the three or more spatial data streams having been transmitted by a corresponding two or more transmit antennas of a transmitting station, wherein the training unit comprises a plurality of inner product modules, an adjoint calculation module, a determinant calculation module, a plurality of reciprocation units, a plurality of multiplier units, a plurality of adder units, a plurality of difference units, and three conjugate transpose modules.

13. A method for generating soft bits within a multicarrier receiver that communicates over a plurality of subcarriers and spatial channels, comprising:

multiplying frequency domain signals generated from each of a plurality of receive signal paths by an equalizer coefficient matrix to remove at least some crosstalk and noise to generate spatially equalized frequency domain signals for each subcarrier;

multiplying the spatially equalized frequency domain signals by soft-bit weights for use in generating soft bits;

generating the equalizer coefficient matrix for each subcarrier from a noise correlation matrix, a channel estimate matrix and an average energy of transmitted sub-symbols; and generating the soft-bit weights from effective channel taps, wherein the effective channel taps comprise only diagonal elements of an effective channel matrix, and wherein the method further comprises generating the diagonal elements of the effective channel matrix from the equalizer coefficient matrix and a channel estimate matrix.

14. The method of claim 13 further comprising receiving two or more spatial data streams concurrently through two or more receive antennas, the two or more spatial data streams having been transmitted by a corresponding two or more transmit antennas of a transmitting station, and wherein the soft bits correspond to each of the two or more spatial data streams.

15. The method of claim 14 wherein the multiplication of the spatially equalized frequency domain signals by the soft-bit weights generates soft-bit weighted spatially equalized frequency domain signals, and wherein the method further comprises generating the soft bits from the soft-bit weighted spatially equalized frequency domain signals, values proportional to the soft-bit weights, and a square root of transmit sub-symbol energy, and wherein a number of soft bits generated depends on a modulation level used by a transmitting station.

16. The method of claim 14 further comprising generating the equalizer coefficient matrix for each subcarrier of a received multicarrier signal for each received packet from training information in each received packet.

17. The method of claim 13 wherein the soft bits comprise real values representing a confidence level for a corresponding hard-bit.

18. The method of claim 13 further comprising generating a set of operational parameters for performing an equalization.

19. A method for generating soft bits within a multicarrier receiver that communicates over a plurality of subcarriers and spatial channels, comprising:

multiplying frequency domain signals generated from each of a plurality of receive signal paths by an equalizer coefficient matrix to remove at least some crosstalk and noise to generate spatially equalized frequency domain signals for each subcarrier;

multiplying the spatially equalized frequency domain signals by soft-bit weights for use in generating soft bits;

generating the equalizer coefficient matrix for each subcarrier and the soft-bit weights from effective channel taps;

receiving two or more spatial data streams concurrently through two or more receive antennas, the two or more spatial data streams having been transmitted by a corresponding two or more transmit antennas of a transmitting station;

generating the equalizer coefficient matrix from a noise correlation matrix, a channel estimate matrix and an average energy of transmitted sub-symbols; and generating a scaled version of the equalizer coefficient matrix using a scale factor, wherein the soft bits correspond to each of the two or more spatial data streams, wherein the scaled version of the equalizer coefficient matrix is used to compute effective channel taps, wherein the soft-bit weights are computed by reciprocating the result of subtracting the corresponding effective channel taps from the scale factor, and wherein operational parameters for the soft-bit demappers are calculated by subtracting one from the result of multiplication of the soft-bit weights by the scale factor.

20. A method for generating soft bits within a multicarrier receiver that communicates over a plurality of subcarriers and spatial channels, comprising:

multiplying frequency domain signals generated from each of a plurality of receive signal paths by an equalizer coefficient matrix to remove at least some crosstalk and noise to generate spatially equalized frequency domain signals for each subcarrier;

multiplying the spatially equalized frequency domain signals by soft-bit weights for use in generating soft bits; and generating the equalizer coefficient matrix for each subcarrier and the soft-bit weights from effective channel taps, wherein the soft-bit weights are generated from a channel estimate matrix, an average energy of transmitted sub-symbols, and a matrix related to a noise correlation matrix, wherein the method further comprises generating a set of operational parameters for soft-bit demapping based on diagonal elements of an effective channel matrix without the use of non-diagonal elements in the effective channel matrix, wherein the effective channel taps comprise only the diagonal elements of the effective channel matrix, and wherein the training unit generates the diagonal elements of the effective channel matrix from the equalizer coefficient matrix and the channel estimate matrix.

21. A method for generating soft bits within a multicarrier receiver that communicates over a plurality of subcarriers and spatial channels, comprising:

multiplying frequency domain signals generated from each of a plurality of receive signal paths by an equalizer coefficient matrix to remove at least some crosstalk and noise to generate spatially equalized frequency domain signals for each subcarrier;

multiplying the spatially equalized frequency domain signals by soft-bit weights for use in generating soft bits;

generating the equalizer coefficient matrix for each subcarrier and the soft-bit weights from effective channel taps;

generating a first set of operational parameters for performing an equalization; and generating a second set of operational parameters for soft-bit demapping based on diagonal elements of an effective channel matrix without the use of non-diagonal elements in the effective channel matrix, wherein calculating the second set of operational parameters includes finding a set of reciprocals, each member of the set of reciprocals being a reciprocal of the difference between one and each diagonal entry in the effective channel matrix, and wherein calculating the second set of operational parameters further includes subtracting a value of one from each reciprocal in the set of reciprocals to yield the second set of operational parameters for the soft-bit demappers.

22. A method for generating soft bits within a multicarrier receiver that communicates over a plurality of subcarriers and spatial channels, comprising:

multiplying frequency domain signals generated from each of a plurality of receive signal paths by an equalizer coefficient matrix to remove at least some crosstalk and noise to generate spatially equalized frequency domain signals for each subcarrier;

multiplying the spatially equalized frequency domain signals by soft-bit weights for use in generating soft bits;

generating the equalizer coefficient matrix for each subcarrier and the soft-bit weights from effective channel taps;

generating a set of operational parameters for performing an equalization; and generating a set of operational parameters for soft-bit demapping based on diagonal elements of an effective channel matrix without the use of non-diagonal elements in the effective channel matrix, wherein the training unit:

calculates a matrix $C(k)$ by premultiplying an inverse of a normalized noise correlation matrix $D(k)$ by the conjugate transpose of the channel estimate matrix;

calculates a matrix $B(k)$ by adding an identity matrix to the result of the premultiplying of the channel estimate matrix by the matrix $C(k)$;

computes a matrix $G(k)$ by inverting the matrix $B(k)$; and computes the soft-bit weights by reciprocating corresponding diagonal elements of the matrix $G(k)$, wherein the identity matrix has a dimension equal to a number of transmit antennas wherein a diagonal soft-bit weight matrix has elements corresponding to the soft-bit weights, and wherein the equalizer coefficient matrix is computed by premultiplying the result, of premultiplying matrix $C(k)$ by matrix $G(k)$, by the diagonal soft-bit weight matrix.

23. A method for generating soft bits within a multicarrier receiver that communicates over a plurality of subcarriers and spatial channels, comprising:

multiplying frequency domain signals generated from each of a plurality of receive signal paths by an equalizer coefficient matrix to remove at least some crosstalk and noise to generate spatially equalized frequency domain signals for each subcarrier;

multiplying the spatially equalized frequency domain signals by soft-bit weights for use in generating soft bits;

generating the equalizer coefficient matrix for each subcarrier and the soft- bit weights from effective channel taps;

receiving two or more spatial data streams concurrently through two or more receive antennas, the two or more spatial data streams having been transmitted by a corresponding two transmit antennas of a transmitting station, wherein the soft bits correspond to each of the two or more spatial data streams, wherein the training unit comprises a plurality of inner product modules, a plurality of conjugate transpose modules, a plurality of adder modules, a plurality of negative reciprocating modules, a magnitude squaring module and a plurality of multiplication modules, and wherein each the inner product module receives first and second vector inputs, computes a conjugate transpose of the first vector input, and performs a matrix multiplication on the conjugate transpose and the second vector input to yield an inner product.

24. A method for generating soft bits within a multicarrier receiver that communicates over a plurality of subcarriers and spatial channels, comprising:

multiplying frequency domain signals generated from each of a plurality of receive signal paths by an equalizer coefficient matrix to remove at least some crosstalk and noise to generate spatially equalized frequency domain signals for each subcarrier;

multiplying the spatially equalized frequency domain signals by soft-bit weights for use in generating soft bits;

generating the equalizer coefficient matrix for each subcarrier and the soft-bit weights from effective channel taps;

receiving two or more spatial data streams concurrently through two or more receive antennas, the two or more spatial data streams having been transmitted by a corresponding two transmit antennas of a transmitting station, wherein the soft bits correspond to each of the two or more spatial data streams, wherein the training unit comprises a plurality of inner product modules, a plurality of conjugate transpose modules, a plurality of adder modules, a plurality of negative reciprocating modules, a magnitude squaring module, and a plurality of multiplication modules, and wherein the multiplication modules and the reciprocating units are arranged to operate concurrently.

25. A method for generating soft bits within a multicarrier receiver that communicates over a plurality of subcarriers and spatial channels, comprising:

multiplying frequency domain signals generated from each of a plurality of receive signal paths by an equalizer coefficient matrix to remove at least some crosstalk and noise to generate spatially equalized frequency domain signals for each subcarrier;

multiplying the spatially equalized frequency domain signals by soft-bit weights for use in generating soft bits;

generating the equalizer coefficient matrix for each subcarrier and the soft-bit weights from effective channel taps;

receiving two or more spatial data streams concurrently through three or more receive antennas, the two or more spatial data streams having been transmitted by a corresponding three transmit antennas of a transmitting station, wherein the soft bits correspond to each of the two or more spatial data streams, wherein the training unit comprises a plurality of inner product modules, an adjoint calculation module, a determinant calculation module, a plurality of reciprocation units, a plurality of multiplier units, a plurality of adder units, a plurality of difference units, and three conjugate transpose modules.

26. A method for determining equalizer coefficient matrices to apply to received frequency domain signals in a multicarrier receiver of a 4×4 multiple-input, multiple-output (MIMO) communication system by determining scaled versions of four unknown matrices P, Q, R and S in the equation $$\begin{bmatrix} A & B \\ C & D \end{bmatrix} \cdot \begin{bmatrix} P & Q \\ R & S \end{bmatrix} = \begin{bmatrix} T & V \\ X & Y \end{bmatrix}$$

wherein matrices A, B, C, D, T, V, X and Y are known, and wherein matrices $P_s$, $Q_s$, $R_s$, and $S_s$ denote scaled versions of matrices P, Q, R and S respectively, the method comprising:

computing a determinant and the an adjoint of the matrix A;

computing a matrix J by pre-multiplying the matrix B with the adjoint of the matrix A;

computing a matrix K by pre-multiplying the matrix T with the adjoint of the matrix A;

computing a matrix E by subtracting the result of a pre-multiplication of the matrix J by the matrix C from the result of a multiplication of the matrix D by the determinant of the matrix A;

computing a determinant and an adjoint of the matrix E;

computing a matrix F by subtracting the result of a pre-multiplication of the matrix K by the matrix C from the result of a multiplication of the matrix X by the determinant of the matrix A;

computing a matrix $R_1$ by pre-multiplying the matrix F with the adjoint of the matrix E;

computing the matrix $P_s$ by subtracting the result of a pre-multiplication of the matrix $R_1$ by the matrix J from the result of multiplication of the matrix K by the determinant of the matrix E;

computing the matrix $R_s$ by multiplying the matrix $R_1$ by the determinant of the matrix A;

computing a scale factor s by multiplying the determinant of the matrix A by the determinant of the matrix E; and prior to the computing steps, partitioning each matrix in a linear matrix equation into four sub-matrices, wherein one known set of the sub-matrices comprises the matrices A, B, C and D, wherein another known set of the sub-matrices comprises the matrices T, V, X and Y, wherein an unknown set of the sub-matrices comprises the matrices P, Q, R and S, wherein the method further comprises repeating the computing steps to determine the matrices $Q_s$ and $S_s$ in terms of matrices A, B, C, D, V and Y, wherein the matrices $P_s$, $Q_s$, $R_s$, and $S_s$ are scaled by the scale factor s with respect to matrices P, Q, R and S respectively, wherein the repeating comprises substituting matrix $Q_s$ for matrix $P_s$, matrix $S_s$ for matrix $R_s$, matrix V for matrix T and matrix Y for matrix X, wherein matrices $P_s$, $Q_s$, $R_s$, and $S_s$ correspond to equalizer coefficient matrices, wherein the computing steps are performed by processing circuitry of a multicarrier receiver, and wherein the method further comprising applying the equalizer coefficient matrices to received frequency domain signals in the multicarrier receiver.

* * * * *

UNITED STATES PATENT AND TRADEMARK OFFICE
CERTIFICATE OF CORRECTION

| | | |
|---|---|---|
| PATENT NO. | : 7,852,951 B2 | Page 1 of 1 |
| APPLICATION NO. | : 11/241189 | |
| DATED | : December 14, 2010 | |
| INVENTOR(S) | : Sudhakar Kalluri et al. | |

It is certified that error appears in the above-identified patent and that said Letters Patent is hereby corrected as shown below:

In column 20, lines 55-58, in Claim 7, after "channel taps,"
delete "wherein the training unit generates the soft-bit weights from a channel estimate matrix, an average energy of transmitted sub-symbols, and a matrix related to a noise correlation matrix," and insert the same on Col. 20, Line 56 as a new paragraph.

In column 20, line 64, in Claim 7, delete "non- diagonal" and insert -- non-diagonal --, therefor.

In column 21, line 22, in Claim 8, delete "non- diagonal" and insert -- non-diagonal --, therefor.

In column 22, line 4, in Claim 10, after "multicarrier" insert -- receiver --.

In column 22, line 63, in Claim 12, after "multicarrier" insert -- receiver --.

In column 24, line 15, in Claim 19, delete "soft- bit" and insert -- soft-bit --, therefor.

In column 24, line 54, in Claim 20, delete "soft- bit" and insert -- soft-bit --, therefor.

In column 24, line 56, in Claim 20, delete "non- diagonal" and insert -- non-diagonal --, therefor.

In column 26, line 4, in Claim 23, delete "soft- bit" and insert -- soft-bit --, therefor.

In column 26, line 67, in Claim 25, after "streams," insert -- and --.

In column 27, line 22, in Claim 26, after "and" delete "the".

In column 28, line 1, in Claim 26, delete "$R_I$" and insert -- $R_1$--, therefor.

In column 28, line 4, in Claim 26, delete "$R_I$" and insert -- $R_1$ --, therefor.

Signed and Sealed this
First Day of March, 2011

David J. Kappos
*Director of the United States Patent and Trademark Office*